US012776250B2

(12) United States Patent
Suyama et al.

(10) Patent No.: US 12,776,250 B2
(45) Date of Patent: Oct. 27, 2026

(54) DISPLAY DEVICE AND CONTROL METHOD OF DISPLAY DEVICE

(71) Applicant: Sharp Display Technology Corporation, Kameyama City (JP)

(72) Inventors: Tatsuhiko Suyama, Kameyama City (JP); Hongbing Weng, Kameyama City (JP); Shunsuke Noichi, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 0 days.

(21) Appl. No.: 19/233,928

(22) Filed: Jun. 10, 2025

(65) Prior Publication Data

US 2026/0004703 A1 Jan. 1, 2026

(30) Foreign Application Priority Data

Jun. 26, 2024 (JP) ................................ 2024-103424

(51) Int. Cl.

*G09G 3/20* (2006.01)
*G06F 3/01* (2006.01)
*G09G 3/34* (2006.01)
*G09G 3/36* (2006.01)

(52) U.S. Cl.

CPC ........... *G09G 3/2096* (2013.01); *G06F 3/013* (2013.01); *G09G 3/3406* (2013.01); *G09G 3/3607* (2013.01); *G09G 3/3648* (2013.01); *G09G 3/3677* (2013.01); *G09G 2300/0804* (2013.01); *G09G 2310/0208* (2013.01); *G09G 2310/0286* (2013.01); *G09G 2310/08* (2013.01); *G09G 2320/0257* (2013.01); *G09G 2320/041* (2013.01); *G09G 2354/00* (2013.01)

(58) Field of Classification Search

CPC ..... G09G 2310/0208; G09G 2310/021; G09G 2310/0213; G09G 2310/0218; G09G 2310/041; G09G 2354/00; G09G 3/3266; G09G 3/3674; G09G 2310/0267; G09G 2310/0205–0221; G09G 2340/0407–0435; G09G 2310/08; G09G 2320/041; G06F 3/14

See application file for complete search history.

(56) References Cited

U.S. PATENT DOCUMENTS 10,079,005 B2 * 9/2018 Gao ......................... G09G 3/20
10,504,442 B2 * 12/2019 Yoo ......................... G06F 3/011
10,657,861 B2 * 5/2020 Gao ......................... G09G 3/20
(Continued)

FOREIGN PATENT DOCUMENTS

JP 2004163828 A * 6/2004
JP 2013-088483 A 5/2013

*Primary Examiner* — Patrick F Marinelli
(74) *Attorney, Agent, or Firm* — ScienBiziP, P.C.

(57) ABSTRACT

A display device includes a control circuit and a temperature sensor. The control circuit causes a gate drive circuit to transmit gate signals to a plurality of gate lines during a light-out period which is a period other than a lighting period in one cycle of a vertical synchronization signal. When a temperature detected by the temperature sensor is lower than a first threshold temperature, the control circuit sets a setting number, which is the number of gate lines supplied with the gate signals from the gate drive circuit in one cycle of a horizontal synchronization signal, to a first number that is greater than one.

7 Claims, 24 Drawing Sheets

| DETECTED TEMPERATURE Ad | MULTI-FOLD HEIGHT DISPLAY REGION |
|---|---|
| Ath1 ≤ Ad | NO FIRST GATE LINE GROUP<br>NO SECOND GATE LINE GROUP |
| Ath2 ≤ Ad < Ath1 | GL1 to GL200 = FIRST GATE LINE GROUP<br>GLn-199 to GLn = SECOND GATE LINE GROUP |
| Ath3 ≤ Ad < Ath2 | GL1 to GL500 = FIRST GATE LINE GROUP<br>GLn-499 to GLn = SECOND GATE LINE GROUP |
| Ad < Ath3 | ALL (NO THIRD GATE LINE GROUP) |

| DETECTED TEMPERATURE Ad | MULTI-FOLD HEIGHT DISPLAY REGION |
|---|---|
| Ath1 ≤ Ad | NONE |
| Ath2 ≤ Ad < Ath1 | GLm = POSITION OF LINE OF SIGHT: CENTER OF THIRD GATE LINE GROUP<br>GLm-500 to GLm+499: THIRD GATE LINE GROUP |
| Ath3 ≤ Ad ≤ Ath2 | GLm = POSITION OF LINE OF SIGHT: CENTER OF THIRD GATE LINE GROUP<br>GLm-200 to GLm+199: THIRD GATE LINE GROUP |
| Ad ≤ Ath3 | ALL |

(56) References Cited

U.S. PATENT DOCUMENTS

| | | | | |
|---|---|---|---|---|
| 10,991,295 | B2 * | 4/2021 | Takizawa | G09G 3/3622 |
| 11,688,329 | B2 * | 6/2023 | Zeng | G06F 1/206 345/545 |
| 12,431,061 | B2 * | 9/2025 | Kim | G09G 3/3258 |
| 12,463,670 | B2 * | 11/2025 | Uchida | H04B 1/036 |
| 2008/0129652 | A1 | 6/2008 | Park | |
| 2008/0211794 | A1 * | 9/2008 | Yi | G09G 3/3648 345/204 |
| 2013/0176348 | A1 * | 7/2013 | Tsai | G09G 3/3614 345/209 |
| 2013/0271661 | A1 * | 10/2013 | Kimura | G09G 5/14 348/564 |
| 2015/0179149 | A1 * | 6/2015 | Park | G06F 3/0484 345/698 |
| 2016/0171938 | A1 * | 6/2016 | Na | G09G 3/3666 345/698 |
| 2016/0329014 | A1 * | 11/2016 | Lee | G09G 3/2096 |
| 2017/0148420 | A1 * | 5/2017 | Gao | G09G 3/20 |
| 2017/0193972 | A1 * | 7/2017 | Gao | G09G 5/003 |
| 2017/0243531 | A1 * | 8/2017 | Moon | G09G 3/2092 |
| 2019/0005884 | A1 * | 1/2019 | Yoo | G09G 3/3266 |
| 2021/0005157 | A1 * | 1/2021 | Takizawa | G09G 3/2018 |
| 2021/0325259 | A1 * | 10/2021 | Sawano | B60R 16/02 |
| 2022/0199162 | A1 * | 6/2022 | Kim | G11C 16/08 |
| 2022/0375393 | A1 * | 11/2022 | Zeng | G06F 1/206 |
| 2023/0028898 | A1 * | 1/2023 | Xu | G09G 5/395 |
| 2023/0368742 | A1 | 11/2023 | Lee | |
| 2024/0203319 | A1 * | 6/2024 | Kim | G09G 3/2096 |
| 2024/0296809 | A1 | 9/2024 | Yang | |
| 2025/0061838 | A1 * | 2/2025 | Shen | G09G 3/2096 |
| 2025/0306631 | A1 * | 10/2025 | Berliner | G06F 1/163 |
| 2026/0004702 | A1 * | 1/2026 | Suyama | G09G 3/2096 |
| 2026/0004703 | A1 * | 1/2026 | Suyama | G06F 3/013 |

* cited by examiner

DOUBLED-HEIGHT DISPLAY (Ad < Ath1)

| DETECTED TEMPERATURE Ad | MULTI-FOLD HEIGHT DISPLAY REGION |
|---|---|
| Ath1 ≤ Ad | NO FIRST GATE LINE GROUP<br>NO SECOND GATE LINE GROUP |
| Ath2 ≤ Ad < Ath1 | GL1 to GL200 = FIRST GATE LINE GROUP<br>GLn-199 to GLn = SECOND GATE LINE GROUP |
| Ath3 ≤ Ad < Ath2 | GL1 to GL500 = FIRST GATE LINE GROUP<br>GLn-499 to GLn = SECOND GATE LINE GROUP |
| Ad < Ath3 | ALL (NO THIRD GATE LINE GROUP) |

FIG. 12

Ad<Ath3

| DETECTED TEMPERATURE Ad | NUMBER k |
|---|---|
| Ath1 ≤ Ad | k = 1 |
| Ath2 ≤ Ad < Ath1 | k = 3/2 |
| Ath3 ≤ Ad < Ath2 | k = 2 |
| Ad < Ath3 | k = 3 |

FIG. 18

| DETECTED TEMPERATURE Ad | NUMBER k | MULTI-FOLD HEIGHT DISPLAY REGION |
|---|---|---|
| Ath1 ≤ Ad | k = 1 | NONE |
| Ath11 ≤ Ad < Ath1 | k = 3/2 | GL1 to GL200: FIRST GATE LINE GROUP |
| | k = 1 | GL201 to GLn-198: THIRD GATE LINE GROUP |
| | k = 3/2 | GLn-199 to GLn: SECOND GATE LINE GROUP |
| Ath12 ≤ Ad < Ath11 | k = 3/2 | GL1 to GL500: FIRST GATE LINE GROUP |
| | k = 1 | GL501 to GLn-498: THIRD GATE LINE GROUP |
| | k = 3/2 | GLn-499 to GLn: SECOND GATE LINE GROUP |
| Ath13 ≤ Ad < Ath12 | k = 3/2 | ALL |
| Ath14 ≤ Ad < Ath13 | k = 2 | GL1 to GL200: FIRST GATE LINE GROUP |
| | k = 3/2 | GL201 to GLn-198: THIRD GATE LINE GROUP |
| | k = 2 | GLn-199 to GLn: SECOND GATE LINE GROUP |
| Ath15 ≤ Ad < Ath14 | k = 2 | GL1 to GL500: FIRST GATE LINE GROUP |
| | k = 3/2 | GL501 to GLn-498: THIRD GATE LINE GROUP |
| | k = 2 | GLn-499 to GLn: SECOND GATE LINE GROUP |
| Ath16 ≤ Ad < Ath15 | k = 2 | ALL |
| Ath17 ≤ Ad < Ath16 | k = 3 | GL1 to GL200: FIRST GATE LINE GROUP |
| | k = 2 | GL201 to GLn-198: THIRD GATE LINE GROUP |
| | k = 3 | GLn-199 to GLn: SECOND GATE LINE GROUP |
| Ath19 ≤ Ad < Ath18 | k = 3 | GL1 to GL500: FIRST GATE LINE GROUP |
| | k = 2 | GL501 to GLn-498: THIRD GATE LINE GROUP |
| | k = 3 | GLn-499 to GLn: SECOND GATE LINE GROUP |
| Ad < Ath19 | k = 3 | ALL |

FIG. 22

| DETECTED TEMPERATURE Ad | MULTI-FOLD HEIGHT DISPLAY REGION |
|---|---|
| Ath1 ≤ Ad | NONE |
| Ath2 ≤ Ad < Ath1 | GLm = POSITION OF LINE OF SIGHT: CENTER OF THIRD GATE LINE GROUP<br>GLm-500 to GLm+499: THIRD GATE LINE GROUP |
| Ath3 ≤ Ad ≤ Ath2 | GLm = POSITION OF LINE OF SIGHT: CENTER OF THIRD GATE LINE GROUP<br>GLm-200 to GLm+199: THIRD GATE LINE GROUP |
| Ad ≤ Ath3 | ALL |

FIG. 24

DISPLAY DEVICE AND CONTROL METHOD OF DISPLAY DEVICE

CROSS-REFERENCE TO RELATED APPLICATIONS

This application claims the benefit of priority to Japanese Patent Application Number 2024-103424 filed on Jun. 26, 2024. The entire contents of the above-identified application are hereby incorporated by reference.

BACKGROUND

Technical Field

The disclosure relates to a display device and a control method of a display device.

In a liquid crystal display device disclosed in JP 2004-163828 A, an image signal is written to a liquid crystal display panel in one cycle of a vertical synchronization signal, and a backlight is intermittently turned on. Further, the liquid crystal display device includes a temperature detection means for detecting the temperature in the device. The liquid crystal display device is configured to double a frame frequency of an image signal supplied to the liquid crystal display panel when the detected temperature is not higher than 20° C.

SUMMARY

In a liquid crystal display device, an image signal is written to a liquid crystal display panel in one cycle of a vertical synchronization signal, and then a backlight is turned on in one cycle of the vertical synchronization signal. After the image signal is written to the liquid crystal display panel, it takes time until a liquid crystal layer of the liquid crystal display panel is driven in response to the image signal, and the length of the time increases (it takes a longer time) as the temperature of the liquid crystal layer becomes lower. Accordingly, when the temperature of the liquid crystal display panel (liquid crystal layer) is low, lighting of the backlight is started before the driving of the liquid crystal layer of the liquid crystal display panel is completed, and the image is caused to blur on the screen.

In the liquid crystal display device described in JP 2004-163828 A, when the detected temperature is equal to or lower than 20° C., the frame frequency of the image signal supplied to the liquid crystal display panel is doubled to suppress the blur of the image. However, increasing (doubling) the frame frequency means reducing (halving) the cycle of a horizontal synchronization signal. This shortens the write time of the image signal per pixel row, which leads to a problem of deterioration in image quality.

The disclosure has been conceived to solve the problems described above, and an object of the disclosure is to provide a display device and a control method of a display device, which can suppress the occurrence of blurring of the image caused by a low temperature while maintaining image quality.

In order to solve the above problems, a display device according to a first aspect includes: a display panel including a plurality of pixel electrodes disposed in a matrix shape and a liquid crystal layer that is driven in response to a voltage applied to the plurality of pixel electrodes; a backlight configured to irradiate the display panel with light during a lighting period which is part of a period in one cycle of a vertical synchronization signal; a plurality of transistors connected to the plurality of pixel electrodes; a plurality of gate lines connected to the plurality of transistors; a gate drive circuit configured to supply gate signals to the plurality of gate lines; a control circuit configured to control the gate drive circuit to transmit the gate signals from the gate drive circuit to the plurality of gate lines during a light-out period which is a period other than the lighting period in one cycle of the vertical synchronization signal; and a temperature sensor. The control circuit sets a setting number, which is the number of gate lines supplied with the gate signals from the gate drive circuit in one cycle of a horizontal synchronization signal, to a first number that is greater than one in a case that a temperature detected by the temperature sensor is lower than a first threshold temperature.

A control method of a display device according to a second aspect is a control method of a display device including a display panel including a plurality of pixel electrodes disposed in a matrix shape and a liquid crystal layer that is driven in response to a voltage applied to the plurality of pixel electrodes, a backlight configured to irradiate the display panel with light during a lighting period which is part of a period in one cycle of a vertical synchronization signal, a plurality of transistors connected to the plurality of pixel electrodes, a plurality of gate lines connected to the plurality of transistors, a gate drive circuit configured to supply gate signals to the plurality of gate lines, a control circuit configured to control the gate drive circuit to transmit the gate signals from the gate drive circuit to the plurality of gate lines during a light-out period which is a period other than the lighting period in one cycle of the vertical synchronization signal, and a temperature detected by the temperature sensor; and setting a setting number, which is the number of gate lines supplied with the gate signals from the gate drive circuit in one cycle of a horizontal synchronization signal, to a first number that is greater than one in a case that the detected temperature is lower than a first threshold temperature.

With the above configuration, it is possible to suppress the occurrence of blurring of the image caused by a low temperature while maintaining image quality.

BRIEF DESCRIPTION OF DRAWINGS

The disclosure will be described with reference to the accompanying drawings, wherein like numbers reference like elements.

FIG. 12 is a diagram illustrating an example of a table stored in a setting register 244 according to the second embodiment.

FIG. 18 is a diagram illustrating an example of a table stored in a setting register 344 according to the third embodiment.

FIG. 22 is a diagram illustrating an example of a table stored in a setting register 444 according to the fourth embodiment.

FIG. 24 is a diagram for explaining control of the display device 500 according to the fifth embodiment.

DESCRIPTION OF EMBODIMENTS

Figure 1:
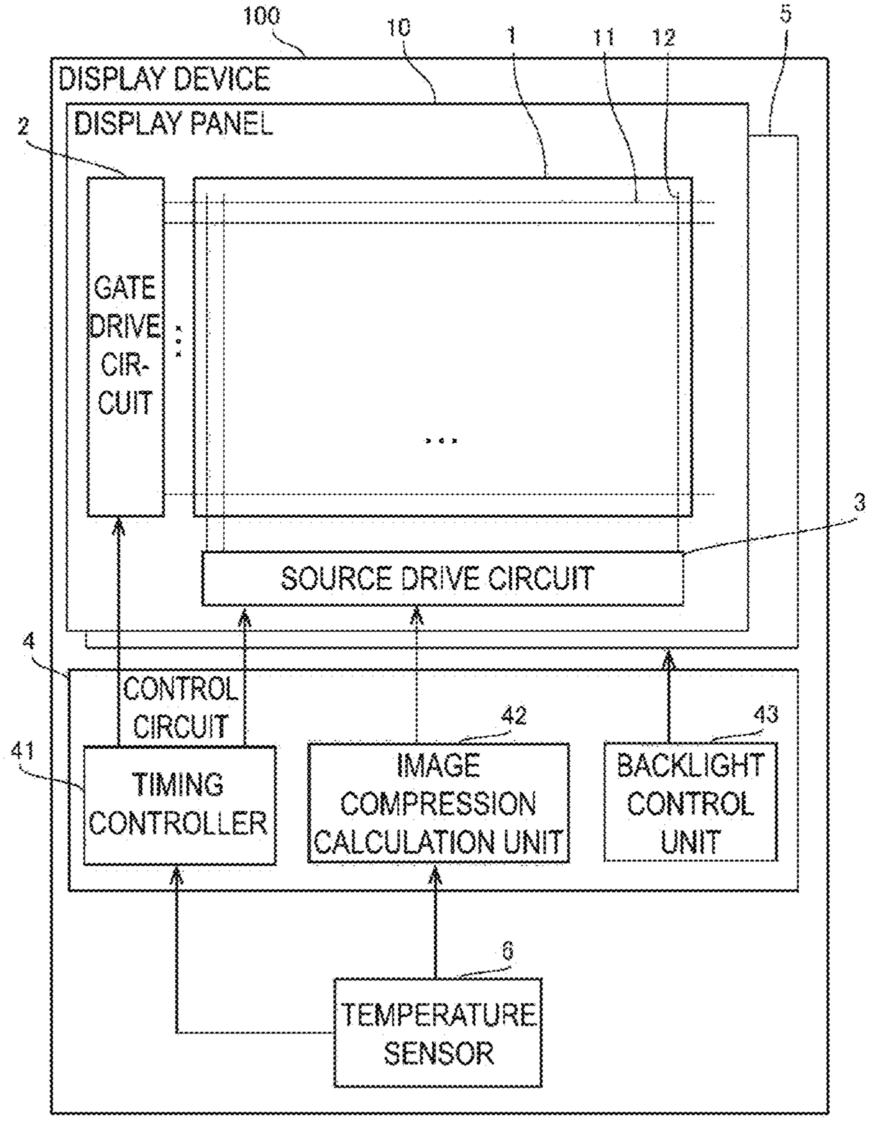
FIG. 1 is a block diagram illustrating a configuration of a display device 100 in a first embodiment.

Embodiments of the disclosure will be described below with reference to the drawings. Note that the disclosure is not limited to the following embodiments, and appropriate design changes can be made within a scope that satisfies the configuration of the disclosure. In the description below, the same reference signs are used in common among the different drawings for portions having the same or similar functions, and repeated description thereof will be omitted. Further, the configurations described in the embodiments and the modified examples may be combined or modified as appropriate within a range that does not depart from the gist of the disclosure. For ease of explanation, in the drawings referenced below, the configuration is simplified or schematically illustrated, or some of the components are omitted.

First Embodiment

Overall Configuration of Display Device

FIG. 1 is a block diagram illustrating a configuration of a display device 100 in a first embodiment. The display device 100 according to the first embodiment is configured as a head-mounted display to be mounted on the head of a person. As illustrated in FIG. 1, the display device 100 is provided with a display panel 10, a control circuit 4, a backlight 5, and a temperature sensor 6. The backlight 5 irradiates the display panel 10 with light, and a user visually recognizes the light transmitted through the display panel 10. The backlight 5 irradiates the display panel 10 with light during a lighting period Tb (see FIG. 7), which is part of a period in one cycle Tf (see FIG. 7) of a vertical synchronization signal. The display panel 10 includes a display portion 1 as a region where an image is displayed, a gate drive circuit 2, and a source drive circuit 3. Although FIG. 1 illustrates an example in which the control circuit 4 is disposed outside the display panel 10 (on a substrate different from the display panel 10), the control circuit 4 may be disposed on the display panel 10. The control circuit 4 includes a timing controller 41, an image compression calculation unit 42, and a backlight control unit 43. The timing controller 41, the image compression calculation unit 42, and the backlight control unit 43 may be configured by a common integrated circuit, or may be configured by individual circuits for respective functions.

The timing controller 41 receives timing signals (such as a horizontal synchronization signal, a vertical synchronization signal, and a data enable signal) and an image signal, and generates part of a source control signal (a digital video signal, a source start pulse signal, and a source clock signal) and a gate control signal (such as a gate start pulse signal and a gate clock signal) based on the received signals. The image compression calculation unit 42 generates part of the source control signal (switch control signals SWA and SWB) and controls the timings of the switch control signals SWA and SWB for switching between regular display (see FIG. 5) and doubled-height display (see FIG. 8). The timing controller 41 and the image compression calculation unit 42 supply the source control signal to the source drive circuit 3. The timing controller 41 also supplies the gate control signal to the gate drive circuit 2. The backlight control unit 43 turns on the backlight 5 by supplying a signal that commands to turn on the backlight 5 (or by supplying power to turn on the backlight 5) during the lighting period Tb (see FIG. 7), which is part of a period in one cycle Tf (see FIG. 7) of the vertical synchronization signal. The lighting period Tb is set at the end of one cycle Tf of the vertical synchronization signal, for example.

The temperature sensor 6 illustrated in FIG. 1 is disposed in the display device 100, and detects a temperature of the display panel 10 inside the display device 100. The temperature sensor 6 may be in contact with the display panel 10, or may be disposed near the display panel 10 (at a position where the temperature of the display panel 10 can be estimated) inside the display device 100. The temperature sensor 6 transmits the detected temperature to the control circuit 4.

Figure 2:
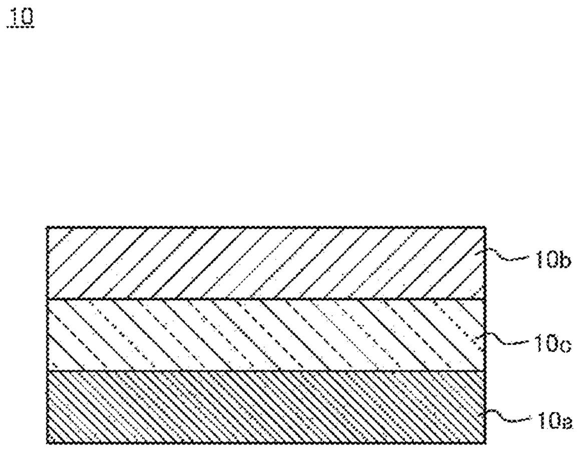
FIG. 2 is a cross-sectional view schematically illustrating a display panel 10.

FIG. 2 is a cross-sectional view schematically illustrating the display panel 10. As illustrated in FIG. 2, the display panel 10 includes an active matrix substrate 10*a*, a counter substrate 10*b* disposed to face the active matrix substrate 10*a*, and a liquid crystal layer 10*c* disposed between the active matrix substrate 10*a* and the counter substrate 10*b*.

Figure 3:
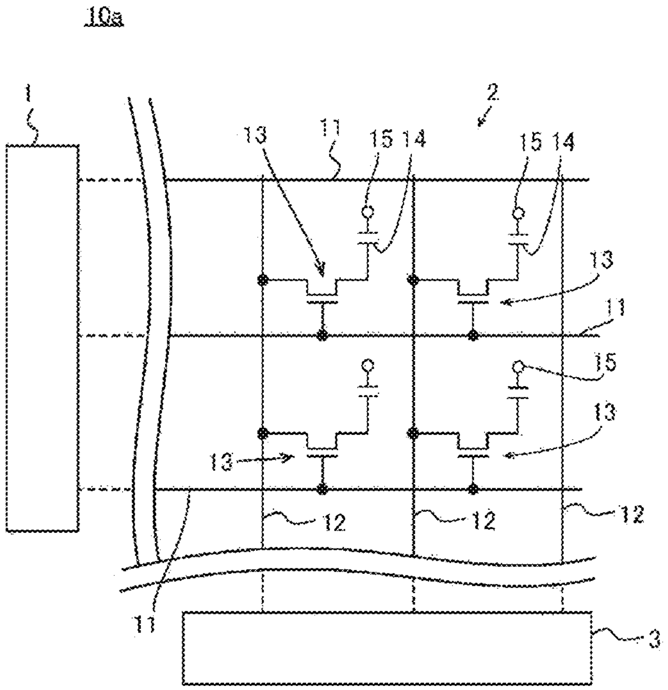
FIG. 3 is a block diagram illustrating a configuration in the display panel 10.

FIG. 3 is a block diagram illustrating a configuration in the active matrix substrate 10*a*. FIG. 3 is also a block diagram illustrating a configuration in the display panel 10. In the active matrix substrate 10*a*, there are disposed a plurality of gate lines 11 connected to the gate drive circuit 2 and a plurality of source lines 12 connected to the source drive circuit 3. The plurality of gate lines 11 and the plurality of source lines 12 are disposed intersecting each other, and a pixel is disposed in each of regions defined by the plurality of gate lines 11 and the plurality of source lines 12. A plurality of the pixels are disposed in a matrix shape in the active matrix substrate 10*a*.

Each pixel is provided with a transistor 13 and a pixel electrode 14. A gate electrode of the transistor 13 is connected to the gate line 11. A source electrode of the transistor 13 is connected to the source line 12. A drain electrode of the transistor 13 is connected to the pixel electrode 14.

When the transistor 13 is turned on by a drive signal (gate signal) supplied via the gate line 11, a source signal supplied via the source line 12 is written (charged) to the pixel electrode 14. With this, an electrical field is formed between the pixel electrode 14 and a common electrode 15 disposed to face the pixel electrode 14. After the formation of the electrical field (after the passage of a period Ta1 in FIG. 7), the liquid crystal layer 10*c* is driven by the electrical field generated between the pixel electrode 14 and the common electrode 15 to transmit light from the backlight 5, thereby making an image displayed on the display portion 1.

Configuration of Source Drive Circuit 3

Figure 4:
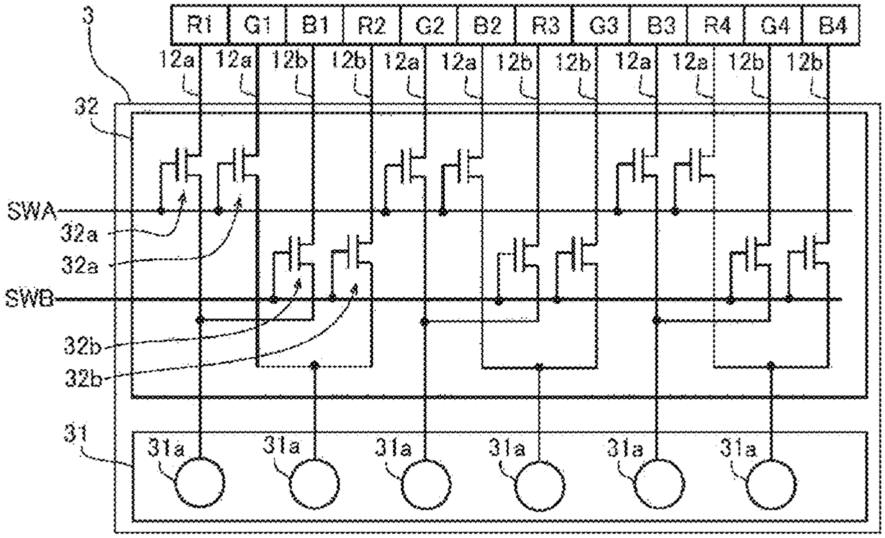
FIG. 4 is a diagram illustrating part of a configuration of a source drive circuit 3.

FIG. 4 is a diagram illustrating part of a configuration of the source drive circuit 3. As illustrated in FIG. 4, the source drive circuit 3 includes an output unit 31 configured to output the source signals and a signal distribution unit 32. The source line 12 includes a source line 12*a* and a source line 12*b*. For example, as illustrated in FIG. 4, two source lines 12*a* and two source lines 12*b* are alternately disposed in the display device 100. A plurality of the source lines 12*a* form a first source line group. A plurality of the source lines 12*b* form a second source line group. Based on a digital video signal, a source start pulse signal, and a source clock signal, the output unit 31 outputs a source signal having a different voltage value (gradation) every one cycle T1 (see FIG. 5) of a horizontal synchronization signal. The output unit 31 includes a plurality of output terminals 31*a* (half the number of source lines 12). The plurality of output terminals 31*a* output source signals having mutually different gradations.

The signal distribution unit 32 is a demultiplexer configured to distribute the source signals output from the output unit 31 to the first source line group and the second source line group. Specifically, the signal distribution unit 32 includes a switch 32*a* disposed between the source line 12*a* and the output terminal 31*a*, and a switch 32*b* disposed between the source line 12*b* and the output terminal 31*a*. The switch 32*a*, when the switch control signal SWA is input thereto, is turned on to supply the source signal from the output terminal 31*a* to the source line 12*a*. The switch 32*b*, when the switch control signal SWB is input thereto, is turned on to supply the source signal from the output terminal 31*a* to the source line 12*b*. To one output terminal 31*a*, connected are one source line 12*a* via the switch 32*a* and one source line 12*b* via the switch 32*b*.

Further, in FIG. 4, a pixel (subpixel) where a red color filter is disposed is denoted by "R", a pixel (subpixel) where a green color filter is disposed is denoted by "G", and a pixel (subpixel) where a blue color filter is disposed is denoted by "B". For example, the source line 12*a* at the left edge of the paper surface in FIG. 4 is connected to the source electrodes of the transistors 13 in a plurality of "R" pixels (referred to as "R1") disposed in a column at the left edge of the paper surface. The red color filter, the green color filter, and the blue color filter are disposed in the counter substrate 10*b*.

Operations of Display Device 100 According to First Embodiment

In the first embodiment, the timing controller 41 and the image compression calculation unit 42 transmit a gate control signal to the gate drive circuit 2 and a source control signal to the source drive circuit 3 to charge the pixel electrode 14 in a write period (period Tw1 in the case of regular display in FIG. 7, period Tw2 in the case of doubled-height display in FIG. 10) in a light-out period Tc as a period other than the lighting period Tb in one cycle of the vertical synchronization signal.

Further, in the first embodiment, the timing controller 41 is configured to switch between the regular display (see FIGS. 5 to 7) and the doubled-height display (see FIGS. 8 to 10) based on the temperature of the display panel 10 detected by the temperature sensor 6 (hereinafter referred to as the "detected temperature Ad"). Specifically, the timing controller 41 sets a setting number, which is the number of source signals written into the pixel electrodes 14 when gate signals are supplied from the gate drive circuit 2 in one cycle (T1) of the horizontal synchronization signal based on the detected temperature Ad. In other words, the "setting number" is the number of gate lines 11 supplied with the gate signals in the period T1. "Regular display" refers to a display operation of the display portion 1 when the setting number is one. "Doubled-height display" refers to a display operation of the display portion 1 when the setting number is two.

When the detected temperature Ad is equal to or higher than a first threshold temperature Ath1, the timing controller 41 sets the setting number to one during the write period Tw1, which is at least part of a period in the light-out period Tc (displays an image on the display portion 1 by regular display). When the detected temperature Ad is lower than the first threshold temperature Ath1, the timing controller 41 sets the setting number to two during the write period Tw2, which is at least part of a period in the light-out period Tc (displays the image on the display portion 1 by doubled-height display). The first threshold temperature Ath1 may be set to be 10° C., for example. Depending on the characteristics of the display device 100 or the liquid crystal layer 10*c*, the first threshold temperature Ath1 may be set to a value in a range from 0° C. to 30° C., but is not limited to these numerical value examples.

Regular Display

Figure 5:
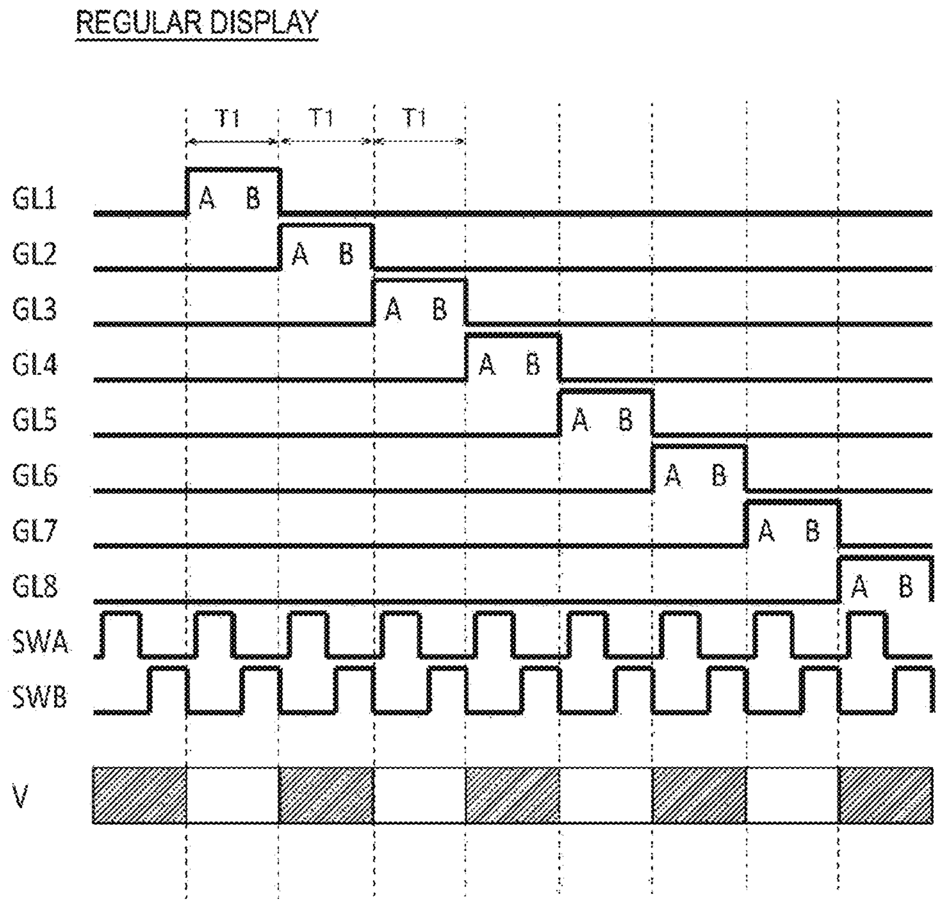
FIG. 5 is a timing chart for explaining regular display (one-fold height display).
Figure 6:
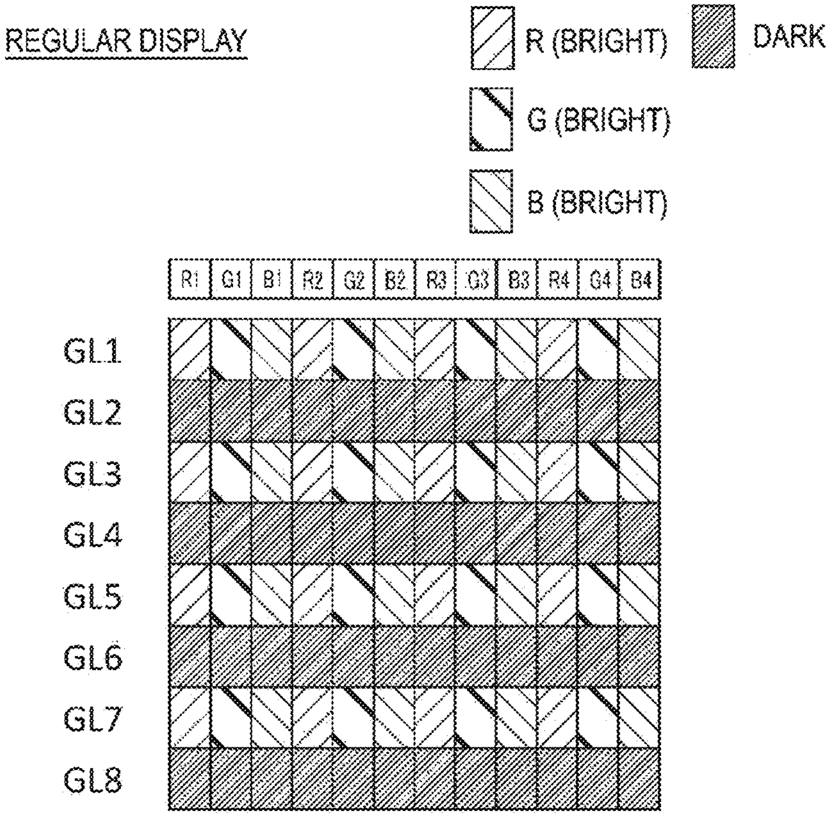
FIG. 6 is a diagram for explaining an example of regular display (one-fold height display).
Figure 7:
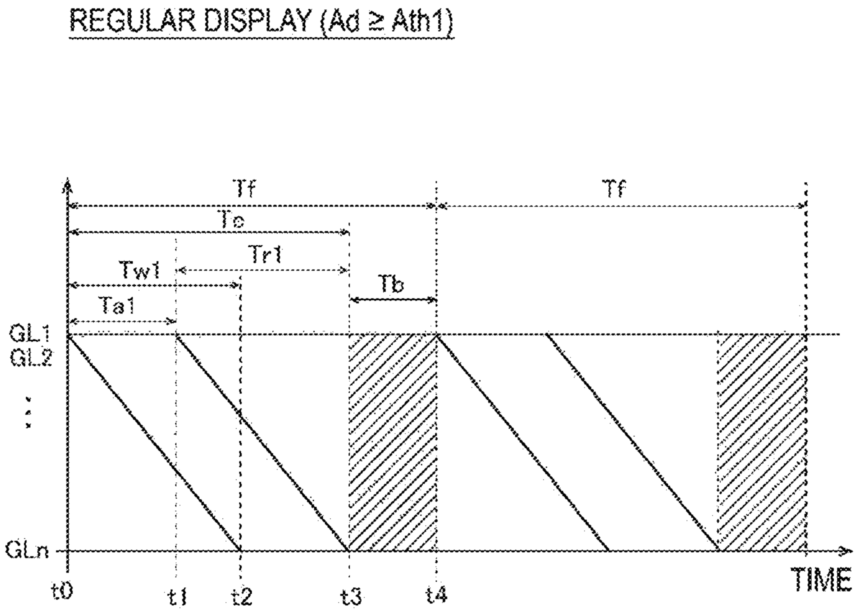
FIG. 7 is a diagram for explaining a relationship between periods in regular display.

FIG. 5 is a timing chart for explaining regular display (one-fold height display). FIG. 6 is a diagram for explaining an example of regular display (one-fold height display). FIG. 7 is a diagram for explaining a relationship between periods in regular display. As illustrated in FIG. 5, the voltage of each of the switch control signal SWA and the switch control signal SWB is set to a high level once in one cycle (period T1) of the horizontal synchronization signal. As a result, the switches 32*a* and 32*b* of the source drive circuit 3 are turned on once in one cycle (period T1) of the horizontal synchronization signal. Note that "A" in the drawing means a period during which the switch 32*a* is turned on, and "B" in the drawing means a period during which the switch 32*b* is turned on.

With the operations of the switches 32*a* and 32*b* as described above, in the regular display, a source signal V output in one cycle of the horizontal synchronization signal charges a plurality of the pixel electrodes 14 (for one line) via a plurality of the transistors 13 (for one line) connected to one gate line 11. For example, in the case of the source signal V having such a gradation that alternately repeats brightness and darkness for each period T1 as illustrated in FIG. 5, the pixels connected to the odd-numbered ("GL1", "GL3", . . . ) gate lines 11 become "bright" (a state of transmitting light from the backlight 5), while the pixels connected to the even-numbered ("GL2", "GL4", . . . ) gate lines 11 become "dark" (a state of blocking light from the backlight 5), as illustrated in FIG. 6.

As illustrated in FIG. 7, one cycle (one frame period) Tf of the vertical synchronization signal is a period from time point to to time point t4. One frame period Tf includes the lighting period Tb, during which the backlight 5 is turned on, and the light-out period Tc, during which the backlight 5 is turned off. The lighting period Tb is a period from time point t3 later than time point to t0 time point t4, which is the final time point of one frame period Tf. The light-out period Tc is a period from time point to to time point t3. Here, "GL1" refers to the first gate line 11, and "GLn" refers to the gate line 11 of the final row. In the write period Tw1 from time point to to time point t2, the gate lines 11 from GL1 to GLn are sequentially scanned to write (charge) the source signals to the pixel electrodes 14.

After writing is performed on the pixel electrodes 14, the liquid crystal layer 10*c* is driven after the passage of the period Ta1 due to the property of the liquid crystal layer 10*c*. Because of this, the driving of the liquid crystal layer 10*c* is performed from time point t1 later than time point to by the period Ta1, to a time point slightly before time point t3. As a result, the driving of the liquid crystal layer 10*c* is completed by time point t3, at which the backlight 5 starts lighting. In this case, the image is not blurred.

Doubled-Height Display

Figure 8:
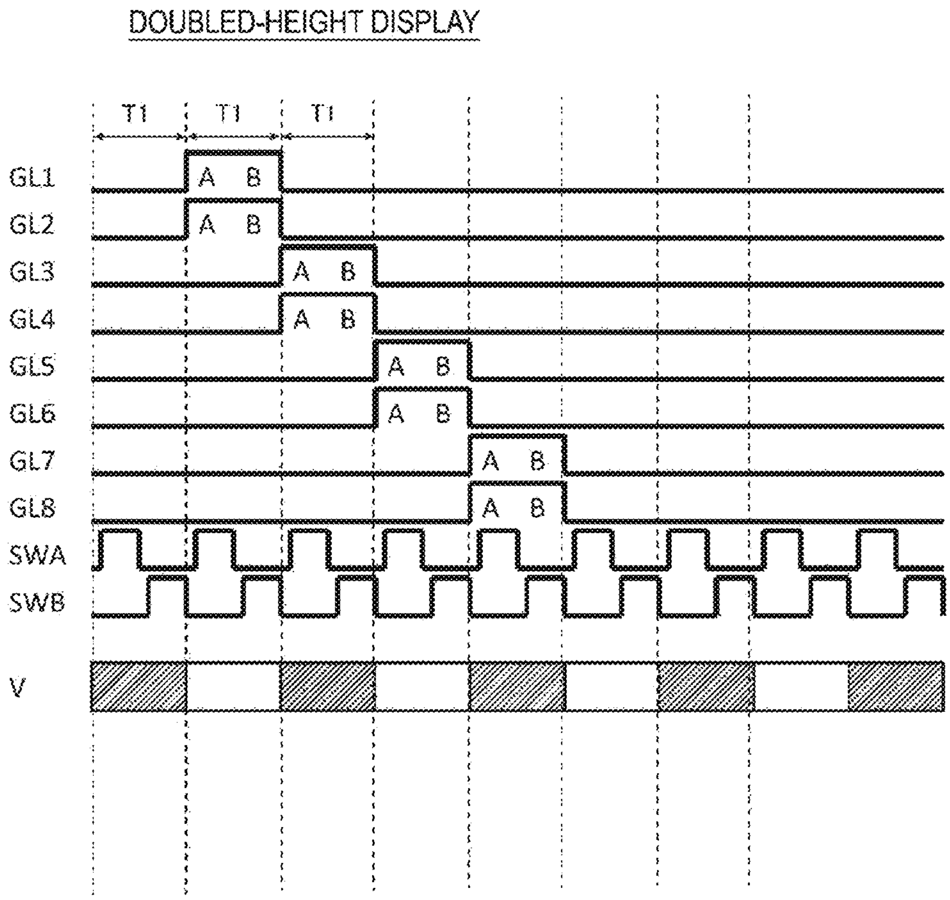
FIG. 8 is a timing chart for explaining a doubled-height display operation of the source drive circuit 3 according to the first embodiment.
Figure 9:
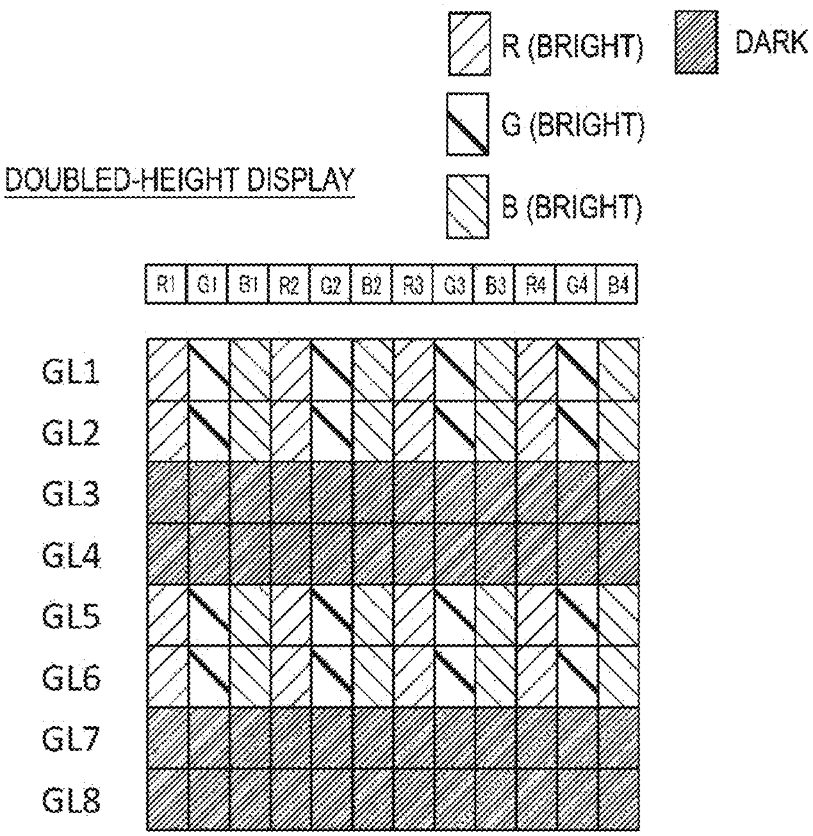
FIG. 9 is a diagram for explaining an example of doubled-height display of the source drive circuit 3.
Figure 10:
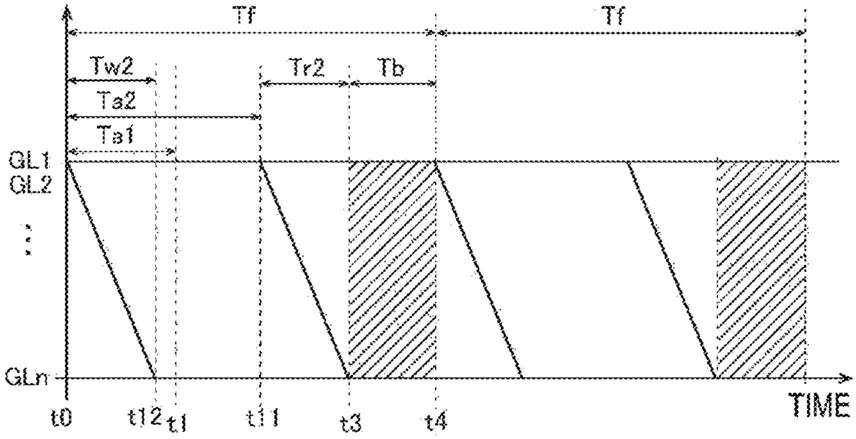
FIG. 10 is a diagram for explaining a relationship between periods in doubled-height display.

FIG. 8 is a timing chart for explaining a doubled-height display operation of the source drive circuit 3 according to the first embodiment. FIG. 9 is a diagram for explaining an example of doubled-height display of the source drive circuit 3. FIG. 10 is a diagram for explaining a relationship between periods in doubled-height display.

As illustrated in FIG. 8, similarly to the regular display, the voltage of each of the switch control signal SWA and the switch control signal SWB is set to a high level once in one cycle (period T1) of the horizontal synchronization signal. As a result, the switches 32*a* and 32*b* of the source drive circuit 3 are turned on once in one cycle (period T1) of the horizontal synchronization signal.

With the operations of the switches 32*a* and 32*b* as described above, in the doubled-height display, source signals output in one cycle of the horizontal synchronization signal charge the plurality of (two rows of) pixel electrodes 14 via the plurality of (two rows of) transistors 13 connected to two gate lines 11. For example, as illustrated in FIG. 8, in the case of the source signal V having such a gradation that alternately repeats brightness and darkness for each period T1, the pixels connected to the gate lines 11 of "GL1", "GL2", "GL5", "GL6", and the like become "bright", while the pixels connected to the gate lines 11 of "GL3", "GL4", "GL7", "GL8", and the like become "dark", as illustrated in FIG. 9.

As illustrated in FIG. 10, in the doubled-height display, in the write period Tw2 from time point to to time point t12, the gate lines 11 from GL1 to GLn are sequentially scanned to write (charge) the source signals to the pixel electrodes 14.

After writing is performed on the pixel electrodes 14, the liquid crystal layer 10*c* is driven after the passage of a period Ta2. A period (response period) from when writing is performed on the pixel electrodes 14 to when the liquid crystal layer 10*c* is driven is longer as the temperature is lower. Therefore, the period Ta2 when the detected temperature Ad is lower than the first threshold temperature Ath1 becomes longer than the period Ta1 when the detected temperature Ad is equal to or higher than the first threshold temperature Ath1. The driving of the liquid crystal layer 10*c* is performed from time point t11 later than time point to by the period Ta2, to a time point slightly before time point t3. As a result, the driving of the liquid crystal layer 10*c* is completed by time point t3, at which the backlight 5 starts lighting, and blurring does not occur in the image even when the detected temperature Ad is lower than the first threshold temperature Ath1 (even when the temperature of the display panel 10 is low).

Second Embodiment

Next, a configuration of a display device 200 according to a second embodiment will be described with reference to FIGS. 11 to 16. In the second embodiment, the display device 200 is configured to refer to a setting register 244 based on a detected temperature Ad and set a number output from the setting register 244 to be the setting number. Note that the same configurations as those of the first embodiment will be denoted by the same reference signs as those of the first embodiment, and descriptions thereof will be omitted.

Figure 11:
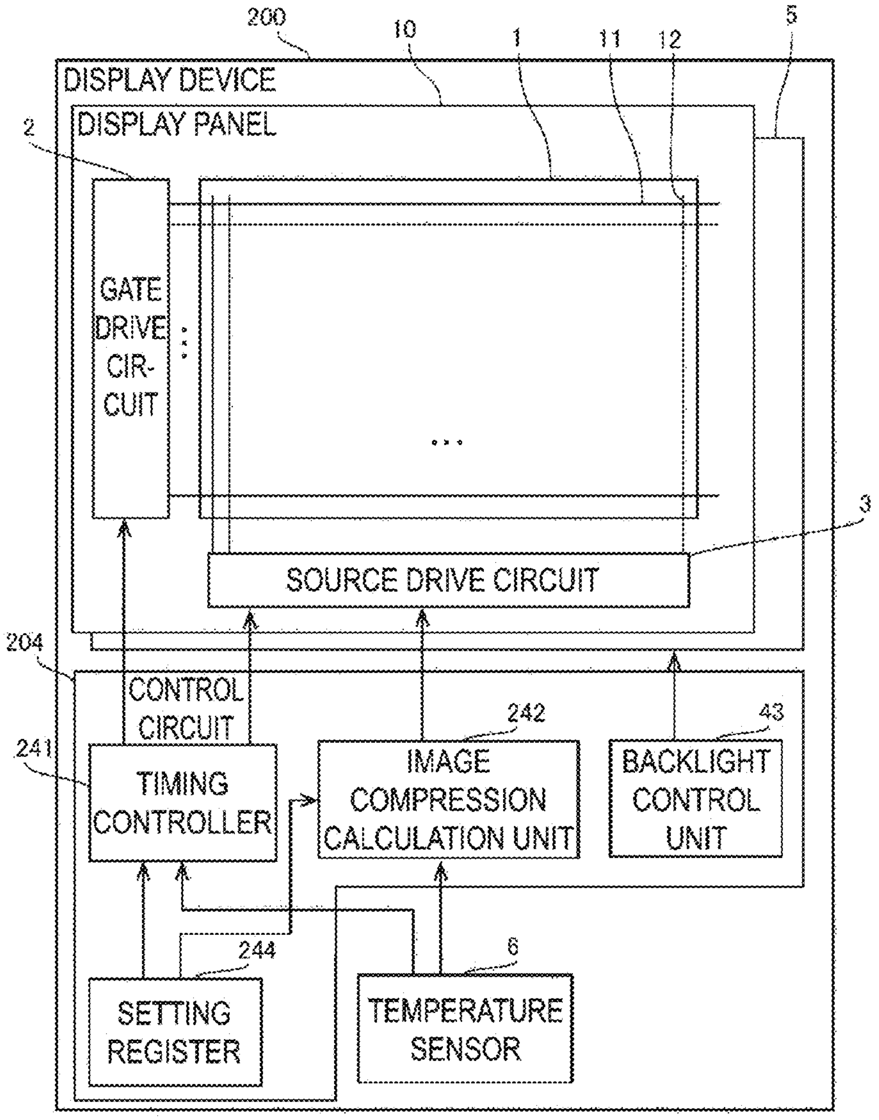
FIG. 11 is a block diagram illustrating a configuration of a display device 200 according to a second embodiment.
Figure 13:
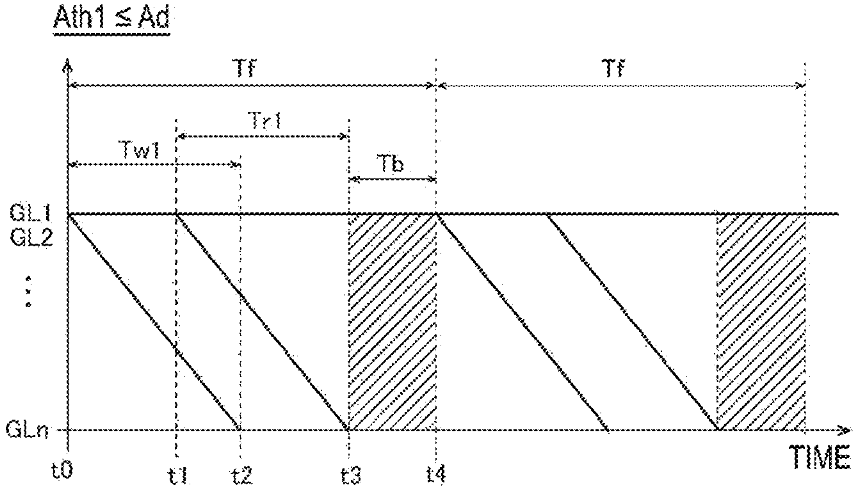
FIG. 13 is a diagram for explaining operations of the display device 200 according to the second embodiment (when a detected temperature Ad is equal to or higher than a first threshold temperature Ath1).
Figure 14:
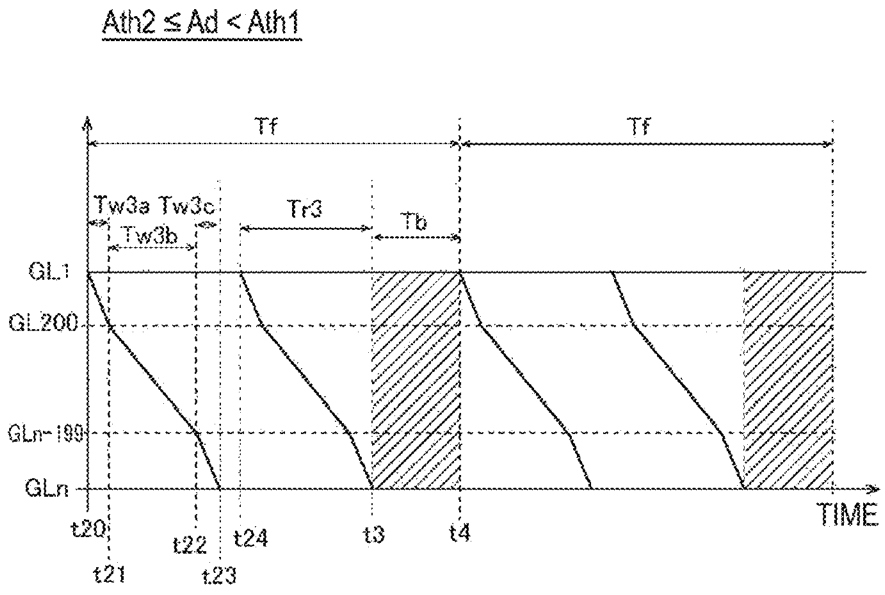
FIG. 14 is a diagram for explaining operations of the display device 200 according to the second embodiment (when the detected temperature Ad is equal to or higher than a second threshold temperature Ath2 and lower than the first threshold temperature Ath1).
Figure 15:
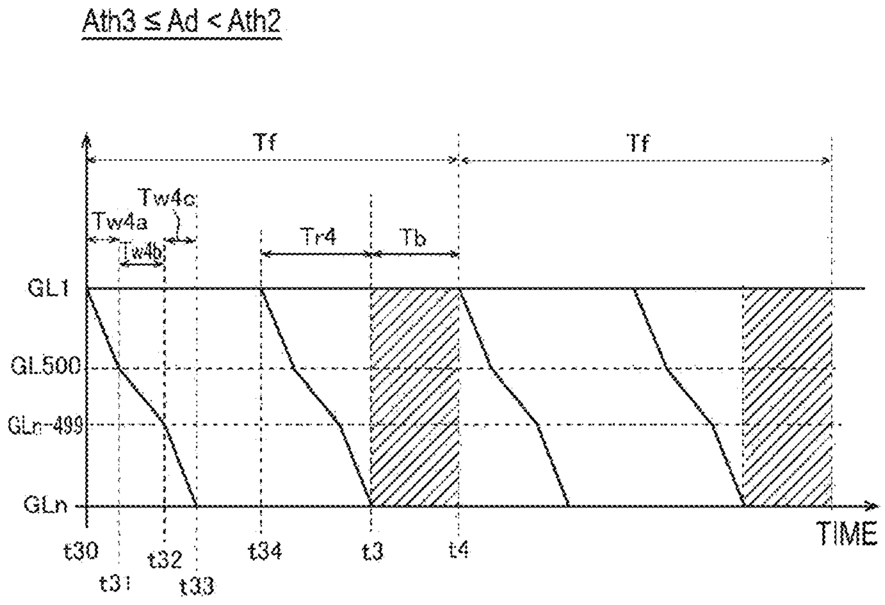
FIG. 15 is a diagram for explaining operations of the display device 200 according to the second embodiment (when the detected temperature Ad is equal to or higher than a third threshold temperature Ath3 and lower than the second threshold temperature Ath2).
Figure 16:
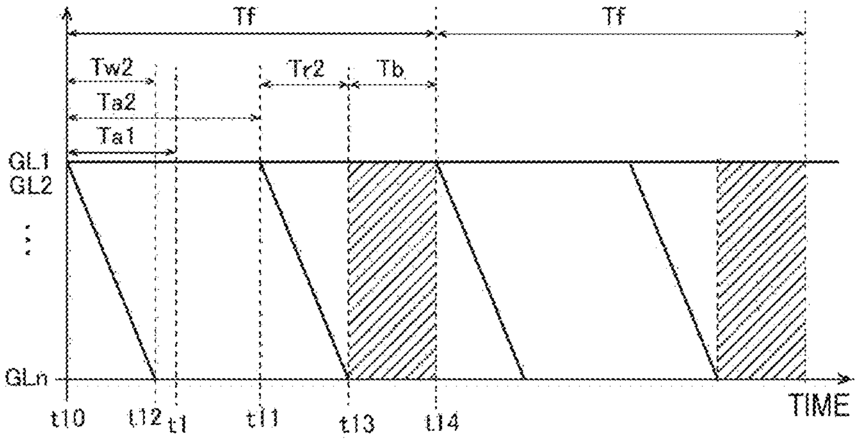
FIG. 16 is a diagram for explaining operations of the display device 200 according to the second embodiment (when the detected temperature Ad is lower than the third threshold temperature Ath3).

FIG. 11 is a block diagram illustrating the configuration of the display device 200 according to the second embodiment. FIG. 12 is a diagram illustrating an example of a table stored in the setting register 244 according to the second embodiment. FIG. 13 is a diagram for explaining operations of the display device 200 according to the second embodiment (when the detected temperature Ad is equal to or higher than a first threshold temperature Ath1). FIG. 14 is a diagram for explaining operations of the display device 200 according to the second embodiment (when the detected temperature Ad is equal to or higher than a second threshold temperature Ath2 and lower than the first threshold temperature Ath1). FIG. 15 is a diagram for explaining operations of the display device 200 according to the second embodiment (when the detected temperature Ad is equal to or higher than a third threshold temperature Ath3 and lower than the second threshold temperature Ath2). FIG. 16 is a diagram for explaining operations of the display device 200 according to the second embodiment (when the detected temperature Ad is lower than the third threshold temperature Ath3). The first threshold temperature Ath1, the second threshold temperature Ath2, and the third threshold temperature Ath3 may be set to be 30° C., 15° C., and 0° C., for example. Depending on the characteristics of the display device 200 or the liquid crystal layer 10*c*, the first threshold temperature Ath1, the second threshold temperature Ath2, and the third threshold temperature Ath3 may be set to values different from the above-described values in a range from 0° C. to 30° C., but are not limited to these numerical value examples.

As illustrated in FIG. 11, the display device 200 according to the second embodiment includes a control circuit 204. The control circuit 204 includes a timing controller 241, an image compression calculation unit 242, and the setting register 244 (storage circuit). As illustrated in FIG. 12, in the setting register 244, information (multi-fold height display region) indicating to which of a first gate line group, a second gate line group, and a third gate line group each of a plurality of gate lines belongs is stored in association with the detected temperature Ad. The "first gate line group" and the "second gate line group" are groups of gate lines 11, in which the setting number is changed to two when the detected temperature Ad is lower than the first threshold temperature Ath1. The "first gate line group" is a set of gate lines from a gate line 11 at a first stage ("GL1") to a gate line 11 at an optional stage. The "second gate line group" is a set of gate lines from a gate line 11 at the final stage ("GLn") to a gate line 11 at an optional stage. The "third gate line group" in the second embodiment is a group of gate lines 11, in which the setting number comes to be one even when the detected temperature Ad is lower than the first threshold temperature Ath1. Further, the "third gate line group" is disposed between the "first gate line group" and the "second gate line group", and is disposed in a central portion of the screen. The setting register 244 is configured such that a table stored therein is rewritten by a setting signal supplied from a host controller (not illustrated) or an external device that supplies an image signal to the display device 200. That is, the table stored in the setting register 244 depicted in FIG. 12 (a correspondence relationship between the "detected temperature Ad" and the "multi-fold height display region") is configured to be changeable.

The second threshold temperature Ath2 depicted in FIG. 12 is considered to be lower than the first threshold temperature Ath1, and the third threshold temperature Ath3 is considered to be lower than the second threshold temperature Ath2. As depicted in FIG. 12, the setting register 244 stores the table, in which the number of gate lines of the first gate line group and the number of gate lines of the second gate line group corresponding to the detected temperature Ad increase as the detected temperature Ad becomes lower.

Case of Ath1≤Ad

When the detected temperature Ad is equal to or higher than the first threshold temperature Ath1, the timing controller 241 refers to the setting register 244, and sets the gate line 11 of the first gate line group to be absent and sets the second gate line group to be absent. Thus, as illustrated in FIG. 13, the timing controller 241 performs regular display in which a gate signal is transmitted to each of all the gate lines 11 per cycle of the horizontal synchronization signal.

Case of Ath2≤Ad<Ath1

When the detected temperature Ad is equal to or higher than the second threshold temperature Ath2 and is lower than the first threshold temperature Ath1, the timing controller 241 refers to the setting register 244, and sets the gate lines 11 of the first gate line group to be 200 gate lines 11 of "GL1" to "GL200", and the second gate line group to be 200 gate lines 11 of "GLn−199" to "GLn". As a result, as illustrated in FIG. 14, the timing controller 241 transmits gate signals to two gate lines 11 per cycle of the horizontal synchronization signal (performs control based on the setting number being two) in a period Tw3*a* (period from time point t20 to time point t21), in which gate signals are supplied to the 200 gate lines 11 of "GL1" to "GL200", and performs doubled-height display. Further, in a period Tw3*b* (period from time point t21 to time point t22), in which gate signals are supplied to the gate lines 11 of "GL201" to "GLn−199", the timing controller 241 transmits a gate signal to one gate line 11 per cycle of the horizontal synchronization signal (performs control based on the setting number being one), and performs regular display. The timing controller 241 transmits gate signals to two gate lines 11 per cycle of the horizontal synchronization signal (performs control based on the setting number being two) in a period Tw3*c* (period from time point t22 to time point t23), in which gate signals are supplied to 200 gate lines 11 of "GLn−199" to "GLn", and performs doubled-height display. Thus, the liquid crystal layer 10*c* is driven in a period Tr3 from time point t24 to a time point slightly before time point t3. As a result, while regular display is performed on the central portion of the screen (the region where the third gate line group is disposed), the image is not blurred even when the detected temperature Ad is lower than the first threshold temperature Ath1 (even when the temperature of the display panel 10 is low).

Case of Ath3≤Ad<Ath2

When the detected temperature Ad is equal to or higher than the third threshold temperature Ath3 and is lower than the second threshold temperature Ath2, the timing controller 241 refers to the setting register 244, and sets the gate lines 11 of the first gate line group to be 500 gate lines 11 of "GL1" to "GL500", and the second gate line group to be 500 gate lines 11 of "GLn−499" to "GLn". As a result, as illustrated in FIG. 15, the timing controller 241 transmits gate signals to two gate lines 11 per cycle of the horizontal synchronization signal (performs control based on the setting number being two) in a period Tw4*a* (period from time point t30 to time point t31), in which gate signals are supplied to the 500 gate lines 11 of "GL1" to "GL500", and performs doubled-height display. Further, in a period Tw4*b* (period from time point t31 to time point t32), in which gate signals are supplied to the gate lines 11 of "GL501" to "GLn−499", the timing controller 241 transmits a gate signal to one gate line 11 per cycle of the horizontal synchronization signal (performs control based on the setting number being one), and performs regular display. The timing controller 241 transmits gate signals to two gate lines 11 per cycle of the horizontal synchronization signal (performs control based on the setting number being two) in a period Tw4*c* (period from time point t32 to time point t33), in which gate signals are supplied to 500 gate lines 11 of "GLn−499" to "GLn", and performs doubled-height display. Thus, the liquid crystal layer 10*c* is driven in a period Tr4 from time point t34 to a time point slightly before time point t3. As a result, while regular display is performed on the central portion of the screen (the region where the third gate line group is disposed), the image is not blurred even when the detected temperature Ad is lower than the second threshold temperature Ath2 (even when the temperature of the display panel 10 is low).

Case of Ad<Ath3

When the detected temperature Ad is lower than the third threshold temperature Ath3, the timing controller 241 refers to the setting register 244, and sets the gate line 11 of the third gate line group to be absent. Thus, as illustrated in FIG. 16, the timing controller 241 performs doubled-height display in which gate signals are transmitted to two gate lines 11 each per cycle of the horizontal synchronization signal (see FIG. 7), with respect to all the gate lines 11. Thus, even when the detected temperature Ad is lower than the third threshold temperature Ath3, the image is not blurred.

Third Embodiment

Next, a configuration of a display device 300 according to a third embodiment will be described with reference to FIGS. 17 to 20. In the third embodiment, the display device 300 is configured such that the setting number can be set to a rational number other than an integer. Note that the same configurations as those of the first or second embodiment will be denoted by the same reference signs as those of the first or second embodiment, and descriptions thereof will be omitted.

Figure 17:
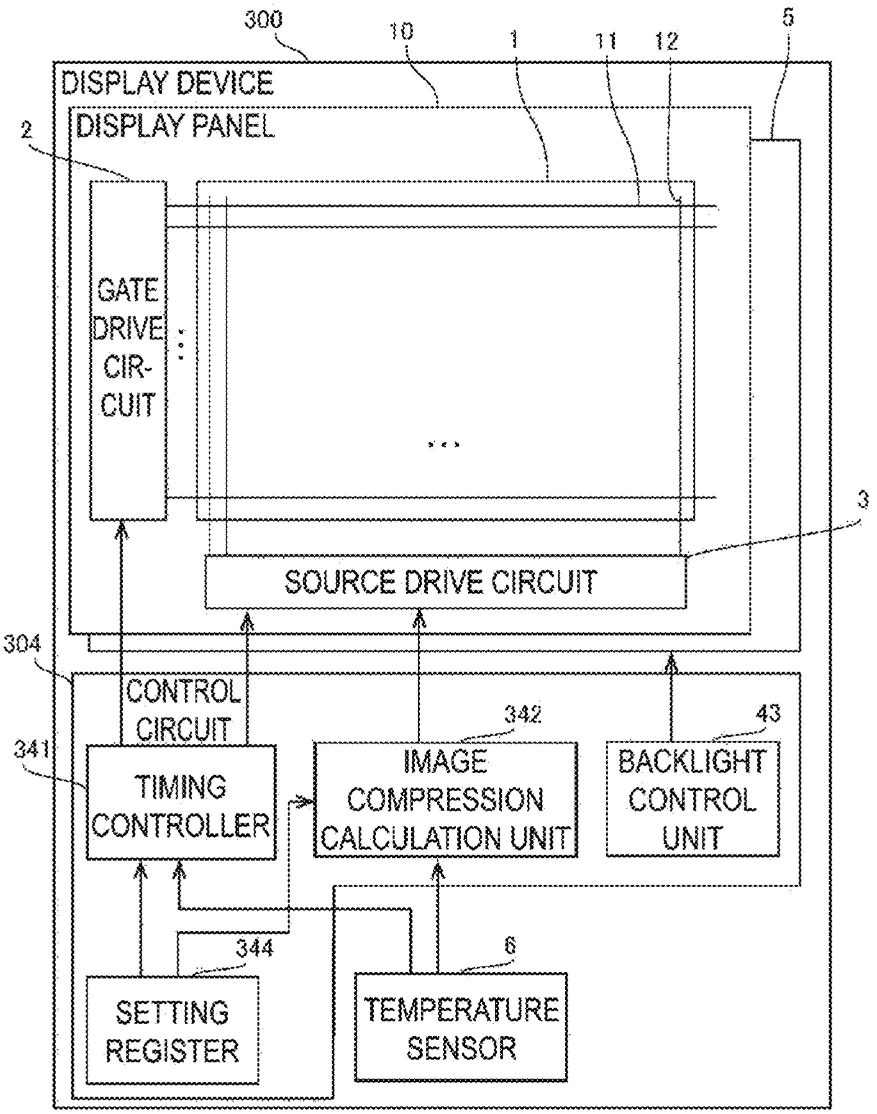
FIG. 17 is a block diagram illustrating a configuration of a display device 300 according to a third embodiment.
Figure 19:
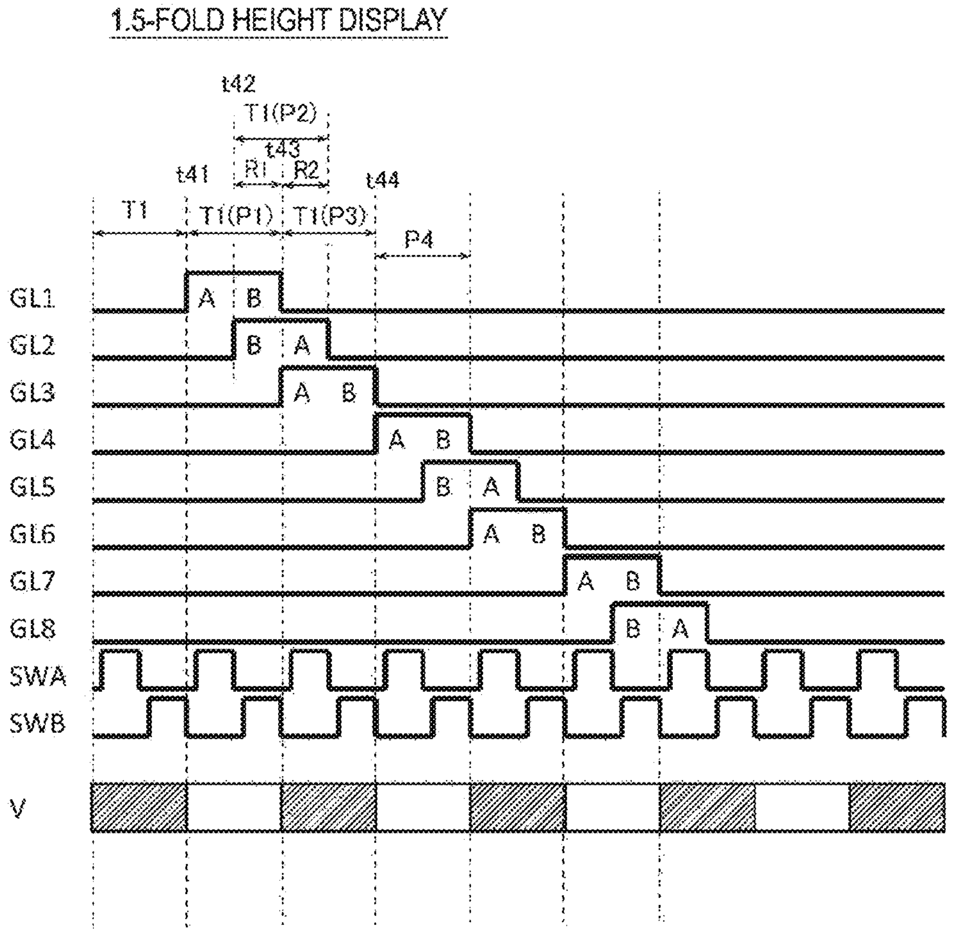
FIG. 19 is a timing chart for explaining 1.5-fold height display according to the third embodiment.
Figure 20:
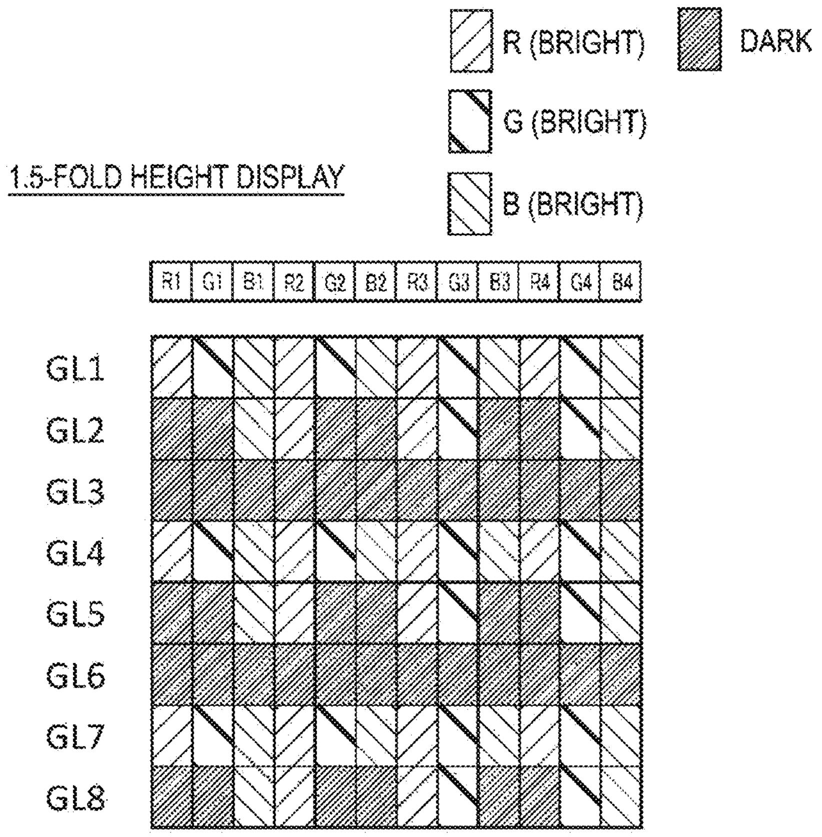
FIG. 20 is a diagram illustrating a screen display example of 1.5-fold height display according to the third embodiment.

FIG. 17 is a block diagram illustrating the configuration of the display device 300 according to the third embodiment. FIG. 18 is a diagram illustrating an example of a table stored in a setting register 344 according to the third embodiment. FIG. 19 is a timing chart for explaining 1.5-fold height display according to the third embodiment. FIG. 20 is a diagram illustrating a screen display example of 1.5-fold height display according to the third embodiment.

As illustrated in FIG. 17, the display device 300 according to the third embodiment includes a control circuit 304. The control circuit 304 includes a timing controller 341, an image compression calculation unit 342, and the setting register 344 (storage circuit). As illustrated in FIG. 18, a number k (k is a positive rational number) is stored in the setting register 344 in association with a detected temperature Ad. When the detected temperature Ad is equal to or higher than a first threshold temperature Ath1, the timing controller 341 refers to the setting register 344, and sets a number 1 output by referring thereto as the setting number. That is, the timing controller 341 performs regular display when the detected temperature Ad is equal to or higher than the first threshold temperature Ath1. When the detected temperature Ad is equal to or higher than a second threshold temperature Ath2 and lower than the first threshold temperature Ath1, the timing controller 341 performs 1.5-fold height display (see FIGS. 19 and 20). The timing controller 341 performs doubled-height display when the detected temperature Ad is equal to or higher than a third threshold temperature Ath3 and lower than the second threshold temperature Ath2. When the detected temperature Ad is lower than the third threshold temperature Ath3, the timing controller 341 performs tripled-height display. The "tripled-height display" is a display method in which gate signals are supplied to three gate lines 11 per cycle of the horizontal synchronization signal. Thus, even when the detected temperature Ad is lower than the third threshold temperature Ath3, the image is not blurred.

1.5-Fold Height Display

Here, the "1.5-fold height display" is a method of displaying an image on the display portion 1 by supplying gate signals to three gate lines 11 and supplying source signals to a plurality of source lines 12 in two cycles (two periods T1 in FIG. 19) of the horizontal synchronization signal. That is, the 1.5-fold height display is a method in which the gate lines 11 are scanned by 1.5 lines each (1.5 times the number of lines in the regular display).

As illustrated in FIG. 19, similarly to the regular display, the voltage of each of a switch control signal SWA and a switch control signal SWB is set to a high level once in one cycle (period T1) of the horizontal synchronization signal. As a result, the switches 32*a* and 32*b* of the source drive circuit 3 are turned on once in one cycle (period T1) of the horizontal synchronization signal.

With the operations of the switches 32*a* and 32*b* as described above, in the 1.5-fold height display, source signals output in two cycles of the horizontal synchronization signal charge the plurality of (three rows of) pixel electrodes 14 via the plurality of (three rows of) transistors 13 connected to three gate lines 11. For example, in the case of a source signal V having such a gradation that alternately repeats brightness and darkness for each period T1 as illustrated in FIG. 19, among the pixels connected to the gate lines 11 of "GL1" to "GL3", half thereof become "bright" and the other half thereof become "dark" as illustrated in FIG. 20. Further, among the pixels connected to the gate lines 11 of "GL4" to "GL6", half thereof become "bright" and the other half thereof become "dark".

As illustrated in FIG. 19, a period during which a gate signal is supplied to the gate line 11 of "GL1" is a first period P1, a period during which a gate signal is supplied to the gate line 11 of "GL2" is a second period P2, a period during which a gate signal is supplied to the gate line 11 of "GL3" is a third period P3, and a period during which a gate signal is supplied to the gate line 11 of "GL4" is a fourth period P4. In the 1.5-fold height display, the second period P2 starts at time point t42 after start time point t41 of the first period P1. The third period P3 starts at time point t43 after start time point t42 of the second period P2. The fourth period P4 starts at time point t44 after start time point t43 of the third period P3.

Part of the first period P1 overlaps with part of the second period P2. Part of the second period P2 overlaps with part of the third period P3. However, the third period P3 does not overlap with the fourth period P4. That is, the gate drive circuit 2 supplies the gate signals to the gate lines 11 of "GL1" to "GL3" in such a manner that part of the first period P1 overlaps with part of the second period P2 and part of the second period P2 overlaps with part of the third period P3 during two cycles of the horizontal synchronization signal.

As illustrated in FIG. 19, the switch control signal SWB is supplied to the switch 32*b* in a period R1, in which the first period P1 and the second period P2 overlap each other, and the switch 32*b* is turned on in the period R1. Thus, the source signal in the first period P1 is supplied to the transistors 13 connected with the second source line group (the source line group supplied with the source signal in a state where the switch 32*b* is turned on) among the plurality of transistors 13 connected to the gate line 11 of "GL2". Further, the switch control signal SWA is supplied to the switch 32*a* in a period R2, in which the second period P2 and the third period P3 overlap each other, and the switch 32*a* is turned on in the period R2. Thus, the source signal in the second period P2 is supplied to the transistors 13 connected with the first source line group (the source line group supplied with the source signal in a state where the switch 32*a* is turned on) among the plurality of transistors 13 connected to the gate line 11 of "GL2". As a result, as illustrated in FIG. 20, half of the pixels connected to the gate line 11 of "GL2" become "bright" and the other half thereof become "dark".

As described above, each of the period R1 and the period R2 is shorter than one cycle of the horizontal synchronization signal, and one of the switch 32*a* and the switch 32*b* is set to be ON in the period R1 and the period R2. Thus, the source signal V is supplied to any of the first source line group and the second source line group also in the period R1 and the period R2, and the display device 300 can display an image. As a result, gate signals can be supplied to non-integer 1.5 gate lines 11 per cycle of the horizontal synchronization signal (1.5-fold height display can be performed). As discussed above, when the detected temperature Ad is lower than the first threshold temperature Ath1 but is equal to or higher than the second threshold temperature Ath2, that is, the detected temperature Ad is relatively high, it is possible to suppress a situation in which the setting number is increased more than necessary. As a result, even when the detected temperature Ad is lower than the first threshold temperature Ath1, the image quality can be improved.

Fourth Embodiment

Next, a configuration of a display device 400 according to a fourth embodiment will be described with reference to FIGS. 21 and 22. In the fourth embodiment, the control method according to the second embodiment and the control method according to the third embodiment are combined. The same configurations as those of any of the first to third embodiments will be denoted by the same reference signs as those of any of the first to third embodiments, and descriptions thereof will be omitted.

Figure 21:
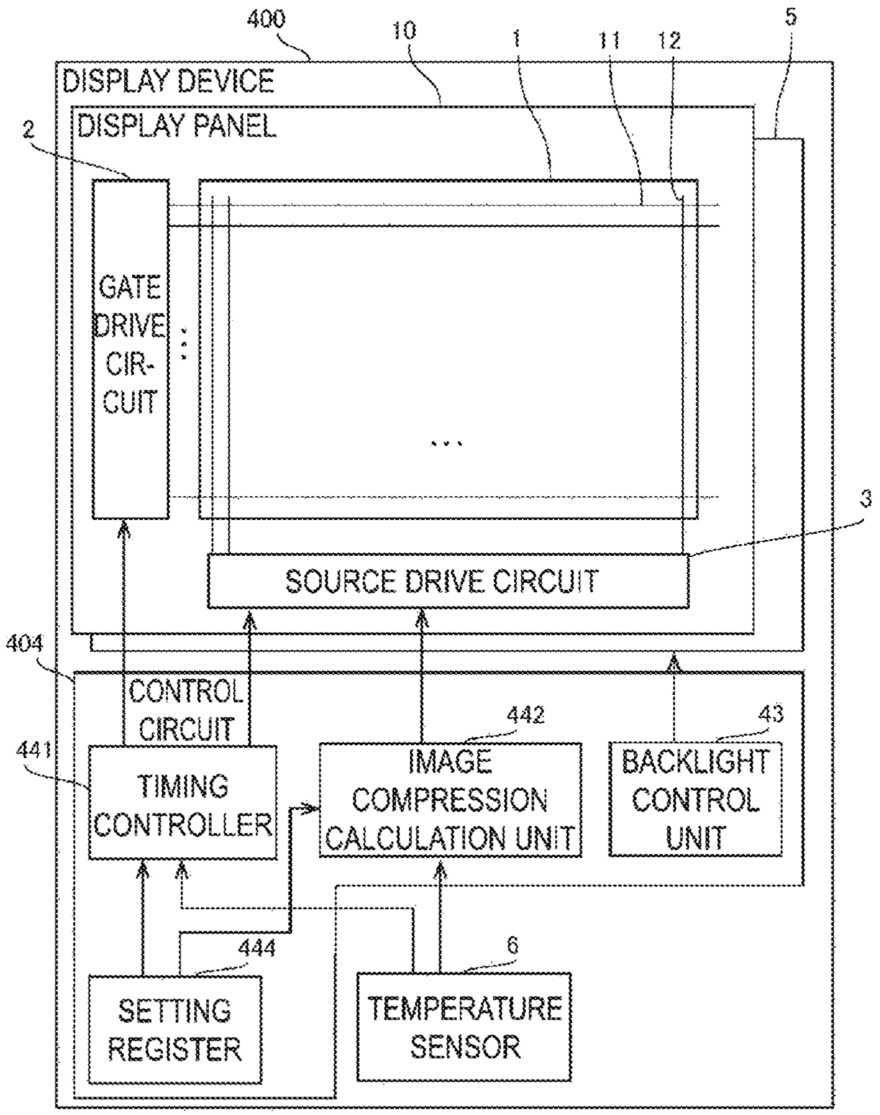
FIG. 21 is a block diagram illustrating a configuration of a display device 400 according to a fourth embodiment.

FIG. 21 is a block diagram illustrating the configuration of the display device 400 according to the fourth embodiment. FIG. 22 is a diagram illustrating an example of a table stored in a setting register 444 according to the fourth embodiment. As illustrated in FIG. 21, the display device

400 according to the fourth embodiment includes a control circuit 404. The control circuit 404 includes a timing controller 441, an image compression calculation unit 442, and the setting register 444.

As illustrated in FIG. 22, the setting register 444 stores a table in which a number k and a multi-fold height display region are associated with a detected temperature Ad. A threshold temperature Ath11 is lower than a first threshold temperature Ath1. Among threshold temperatures Ath11 to Ath19, the threshold temperature Ath11 is the highest temperature while the threshold temperature Ath19 is the lowest temperature. The threshold temperatures Ath11 to Ath19 become lower in this order.

As illustrated in FIG. 22, in the table stored in the setting register 444, when the detected temperature Ad is equal to or higher than the threshold temperature Ath12 and lower than the first threshold temperature Ath1, the setting numbers of the first gate line group and the second gate line group are each set to 1.5 (=3/2), and the setting number of the third gate line group is set to one. The detected temperature Ad and the multi-fold height display region are associated with each other so that the numbers of gate lines 11 of the first gate line group and the second gate line group increase as the detected temperature Ad is lower. In this table, when the detected temperature Ad is equal to or higher than the threshold temperature Ath13 and lower than the threshold temperature Ath12, the setting numbers of all the gate lines 11 are each set to 1.5. In this table, when the detected temperature Ad is equal to or higher than the threshold temperature Ath15 and lower than the threshold temperature Ath13, the setting numbers of the first gate line group and the second gate line group are each set to two, and the setting number of the third gate line group is set to 1.5. The detected temperature Ad and the multi-fold height display region are associated with each other so that the numbers of gate lines 11 of the first gate line group and the second gate line group increase as the detected temperature Ad is lower. In this table, when the detected temperature Ad is equal to or higher than the threshold temperature Ath16 and lower than the threshold temperature Ath15, the setting numbers of all the gate lines 11 are each set to two. In this table, when the detected temperature Ad is equal to or higher than the threshold temperature Ath19 and lower than the threshold temperature Ath16, the setting numbers of the first gate line group and the second gate line group are each set to three, and the setting number of the third gate line group is set to two. The detected temperature Ad and the multi-fold height display region are associated with each other so that the numbers of gate lines 11 of the first gate line group and the second gate line group increase as the detected temperature Ad is lower. Further, in this table, when the detected temperature Ad is lower than the threshold temperature Ath19, the setting numbers of all the gate lines 11 are each set to three. Thus, the lower the detected temperature Ad is, the shorter the write period is; therefore, even when the detected temperature Ad is low, the image is not blurred.

Fifth Embodiment

Next, a configuration of a display device 500 according to a fifth embodiment will be described with reference to FIGS. 23 and 24. In the fifth embodiment, the display device 500 determines a third gate line group in accordance with a detection result from a line-of-sight sensor 507. The same configurations as those of any of the first to fourth embodiments will be denoted by the same reference signs as those of any of the first to fourth embodiments, and descriptions thereof will be omitted.

Figure 23:
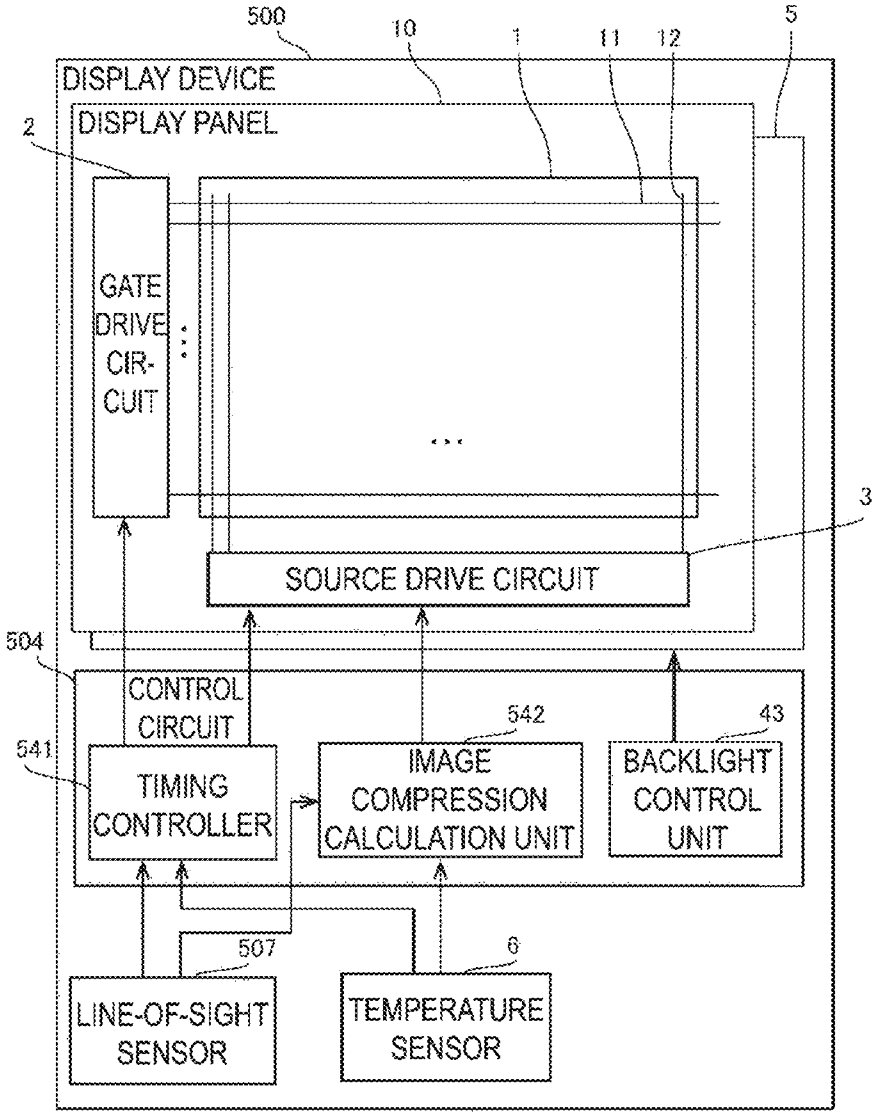
FIG. 23 is a block diagram illustrating a configuration of a display device 500 according to a fifth embodiment.

FIG. 23 is a block diagram illustrating the configuration of the display device 500 according to the fifth embodiment. FIG. 24 is a diagram for explaining control of the display device 500 according to the fifth embodiment. As illustrated in FIG. 23, the display device 500 according to the fifth embodiment includes a control circuit 504 and the line-of-sight sensor 507. The control circuit 504 includes a timing controller 541 and an image compression calculation unit 542. The line-of-sight sensor 507 includes a camera that captures visible light, and detects a reference point (e.g., the canthus) and a moving point (e.g., the iris) of the eye of the user using the camera. Based on a positional relationship between the reference point and the moving point, the line-of-sight sensor 507 transmits information indicating which position in the display panel 10 of the display device 500 the user is viewing, to the control circuit 504.

The control circuit 504 sets a center GLm (m is a natural number) of the third gate line group based on the detection result from the line-of-sight sensor 507. When a detected temperature Ad is equal to or higher than a first threshold temperature Ath1, the timing controller 541 performs regular display. When the detected temperature Ad is equal to or higher than a second threshold temperature Ath2 and lower than the first threshold temperature Ath1, the timing controller 541 sets a gate line group from the gate line 11 of "GLm−500" to the gate line 11 of "GLm+499" including the gate line 11 of the center GLm of the third gate line group, as the third gate line group. That is, the timing controller 541 controls the gate line group from the gate line 11 of "GLm−500" to the gate line 11 of "GLm+499" by regular display (the setting number is one), and controls the other gate lines 11 by doubled-height display (the setting number is two). When the detected temperature Ad is equal to or higher than a third threshold temperature Ath3 and lower than the second threshold temperature Ath2, the timing controller 541 sets a gate line group from the gate line 11 of "GLm−200" to the gate line 11 of "GLm+199" including the gate line 11 of the center GLm of the third gate line group, as the third gate line group. That is, the timing controller 541 controls the gate line group from the gate line 11 of "GLm−200" to the gate line 11 of "GLm+199" by regular display (the setting number is one), and controls the other gate lines 11 by doubled-height display (the setting number is two). This makes it possible to suppress the occurrence of blurring of the image while performing regular display on a portion viewed by the user (a region where the third gate line group is disposed).

Modified Examples

Although embodiments of the disclosure have been described above, the embodiments described above are merely examples for implementing the disclosure. Thus, the disclosure is not limited to the embodiments described above, and can be implemented by appropriately modifying the embodiments described above without departing from the scope of the spirit of the disclosure. Now, modified examples of the above-described embodiments will be described.

(1) The example in which the display device performs regular display, 1.5-fold height display, doubled-height display, and tripled-height display is described in the first to fifth embodiments, but the disclosure is not limited thereto. For example, the display device may be configured to perform 1.33-fold height display (rational number-fold height display other than 1.5-fold height display) and quadruple height display (four or more-fold height display).

(2) The example in which the switch control signal SWA and the switch control signal SWB are set to a high level in this order in one cycle of the horizontal synchronization signal is described in the first to fifth embodiments, but the disclosure is not limited thereto. For example, the distribution unit (demultiplexer) may be configured such that three or more switch control signals are sequentially set to a high level in one cycle of the horizontal synchronization signal, or the distribution unit (demultiplexer) may be allowed not to be disposed in the source drive circuit.

(3) In the first to fifth embodiments, the lighting period is defined as a period including the final time point of one frame period, but the disclosure is not limited thereto. For example, the lighting period may be provided at the beginning of one frame period, and the write period may be provided after the lighting period.

The above-described configuration can also be described as follows.

A display device according to a first configuration includes: a display panel including a plurality of pixel electrodes disposed in a matrix shape and a liquid crystal layer that is driven in response to a voltage applied to the plurality of pixel electrodes; a backlight configured to irradiate the display panel with light during a lighting period which is part of a period in one cycle of a vertical synchronization signal; a plurality of transistors connected to the plurality of pixel electrodes; a plurality of gate lines connected to the plurality of transistors; a gate drive circuit configured to supply gate signals to the plurality of gate lines; a control circuit configured to control the gate drive circuit to transmit the gate signals from the gate drive circuit to the plurality of gate lines during a light-out period which is a period other than the lighting period in one cycle of the vertical synchronization signal; and a temperature sensor. The control circuit sets a setting number, which is the number of gate lines supplied with the gate signals from the gate drive circuit in one cycle of a horizontal synchronization signal, to a first number that is greater than one in a case that a temperature detected by the temperature sensor is lower than a first threshold temperature (the first configuration).

In a display device provided with a display panel including a liquid crystal layer, gate signals are supplied to a plurality of gate lines in one cycle of a vertical synchronization signal, a voltage is supplied (an image signal is written) to a pixel electrode via a transistor that is made to be ON by the supply of the gate signal, and then a backlight is turned on within one cycle of the vertical synchronization signal. After the image signal is written to the display panel, it takes time until the liquid crystal layer of the display panel is driven in response to the image signal, and the length of the time increases (it takes a longer time) as the temperature of the liquid crystal layer becomes lower. Accordingly, when the temperature of the display panel (liquid crystal layer) is low, lighting of the backlight is started before the driving of the liquid crystal layer of the display panel is completed, and the image is blurred on the screen. With regard to this, according to the first configuration, when the temperature of the display panel is lower than the first threshold temperature, the number of gate lines supplied with a voltage in one cycle of the horizontal synchronization signal can be made greater than one. That is, voltages can be collectively applied to the pixel electrodes of more than one row in one cycle of the horizontal synchronization signal. Therefore, without changing the length of one cycle of the horizontal synchronization signal (while maintaining the image quality), the period needed to apply voltages to all the pixel electrodes (the period for writing the image signal to the pixel electrodes) can be shortened. Thus, a period in which the liquid crystal layer of the display panel is driven in response to the voltage (image signal) can be secured, which makes it possible to suppress a situation in which the lighting of the backlight starts before the driving of the liquid crystal layer of the display panel is completed. As a result, it is possible to suppress the blurring of the image on the screen while maintaining the image quality.

In the first configuration, the plurality of gate lines may include a first gate line group, a second gate line group, and a third gate line group disposed between the first gate line group and the second gate line group. The control circuit may be configured to set the setting number for the first gate line group and the second gate line group to the first number and set the setting number for the third gate line group to a second number that is equal to or greater than one and less than the first number in a case that the detected temperature is lower than the first threshold temperature (a second configuration).

In general, a user views a central portion of the screen. With regard to this, according to the second configuration, the number of gate lines supplied with the gate signals per cycle of the horizontal synchronization signal can be made smaller in the central portion of the screen (the region where the third gate line group is disposed) than those in the other regions (the regions at the upper and lower ends of the screen). This makes it possible to suppress a situation in which the image is blurred on the screen while improving image quality of the central portion visually recognized by the user.

In the second configuration, the display device may further include a first storage circuit in which information indicating to which of the first gate line group, the second gate line group, and the third gate line group at least part of the plurality of gate lines belong is stored in association with the detected temperature. The control circuit may be configured to refer to the information based on the detected temperature and set the at least part of the plurality of gate lines to belong to any of the first gate line group, the second gate line group, and the third gate line group (a third configuration).

According to the third configuration, the dimensions of the region of the central portion of the screen can be changed in accordance with the temperature of the display panel while suppressing a situation in which the image is blurred on the screen.

In the second configuration, the display device may further include a line-of-sight sensor that detects a line of sight of a user. The control circuit may be configured to set the third gate line group based on a detection result from the line-of-sight sensor such that the third gate line group includes the gate line corresponding to a position viewed by the user (a fourth configuration).

According to the fourth configuration, the speed of scanning of a portion other than the line of sight can be increased while improving image quality of the image on the screen at the destination of the line of sight of the user.

In any one of the first to fourth configurations, the control circuit may be configured to set the setting number to a third number that is greater than the first number in a case that the temperature of the display panel detected by the temperature sensor is lower than a second threshold temperature that is lower than the first threshold temperature (a fifth configuration).

According to the fifth configuration, even when the temperature of the display panel is lower than the second threshold temperature that is lower than the first threshold temperature, it is possible to suppress a situation in which the image is blurred on the screen while maintaining the image quality.

In any one of the first to fourth configurations, the display device may further include a second storage circuit in which a number is stored in association with the detected temperature. The control circuit may be configured to refer to the second storage circuit based on the detected temperature and set the number read from the second storage circuit as the setting number (a sixth configuration).

According to the sixth configuration, it is possible to suppress a situation in which the image is blurred on the screen while maintaining the image quality in accordance with the temperature of the display panel.

A control method of a display device according to a seventh configuration is a control method of a display device including a display panel including a plurality of pixel electrodes disposed in a matrix shape and a liquid crystal layer that is driven in response to a voltage applied to the plurality of pixel electrodes, a backlight configured to irradiate the display panel with light during a lighting period which is part of a period in one cycle of a vertical synchronization signal, a plurality of transistors connected to the plurality of pixel electrodes, a plurality of gate lines connected to the plurality of transistors, a gate drive circuit configured to supply gate signals to the plurality of gate lines, a control circuit configured to control the gate drive circuit to transmit the gate signals from the gate drive circuit to the plurality of gate lines during a light-out period which is a period other than the lighting period in one cycle of the vertical synchronization signal, and a temperature detected by the temperature sensor; and setting a setting number, which is the number of gate lines supplied with the gate signals from the gate drive circuit in one cycle of a horizontal synchronization signal, to a first number that is greater than one in a case that the detected temperature is lower than a first threshold temperature (the seventh configuration).

With the seventh configuration, it is possible to provide a control method of a display device capable of suppressing the occurrence of blurring of the image caused by a low temperature while maintaining the image quality.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A display device comprising:

a display panel including a plurality of pixel electrodes disposed in a matrix shape and a liquid crystal layer that is driven in response to a voltage applied to the plurality of pixel electrodes;

a backlight configured to irradiate the display panel with light during a lighting period which is part of a period in one cycle of a vertical synchronization signal;

a plurality of transistors connected to the plurality of pixel electrodes;

a plurality of gate lines connected to the plurality of transistors, wherein the plurality of gate lines includes a first gate line group, a second gate line group, and a third gate line group disposed between the first gate line group and the second gate line group;

a gate drive circuit configured to supply gate signals to the plurality of gate lines;

a control circuit configured to control the gate drive circuit to transmit the gate signals from the gate drive circuit to the plurality of gate lines during a light-out period which is a period other than the lighting period in the one cycle of the vertical synchronization signal; and a temperature sensor for detecting a temperature, wherein the control circuit:

sets a setting number, which is a number of gate lines supplied with the gate signals from the gate drive circuit in one cycle of a horizontal synchronization signal, to a first number, that is greater than one, for the first gate line group and the second gate line group, in a case that the temperature detected by the temperature sensor is lower than a first threshold temperature, and sets the setting number for the third gate line group to a second number that is equal to or greater than one and less than the first number in the case that the detected temperature is lower than the first threshold temperature.

2. The display device according to claim 1, further comprising:

a first storage circuit in which information, indicating to which of the first gate line group, the second gate line group, and the third gate line group at least part of the plurality of gate lines belong, is stored in association with the detected temperature, wherein the control circuit refers to the information based on the detected temperature, and sets the at least part of the plurality of gate lines to belong to any of the first gate line group, the second gate line group, and the third gate line group.

3. The display device according to claim 2, further comprising:

a line-of-sight sensor that detects a line of sight of a user, wherein the control circuit sets the at least part of the plurality of gate lines to belong to the third gate line group based on a detection result from the line-of-sight sensor, such that the third gate line group includes a gate line corresponding to a position viewed by the user.

4. The display device according to claim 1, wherein the control circuit sets the setting number to a third number that is greater than the first number in a case that the detected temperature is lower than a second threshold temperature that is lower than the first threshold temperature.

5. The display device according to claim 1, further comprising:

a first storage circuit in which a number is stored in association with the detected temperature, wherein the control circuit refers to the first storage circuit based on the detected temperature, and sets the number read from the first storage circuit as the setting number.

6. A control method of a display device including:

a display panel including a plurality of pixel electrodes disposed in a matrix shape and a liquid crystal layer that is driven in response to a voltage applied to the plurality of pixel electrodes, a backlight configured to irradiate the display panel with light during a lighting period which is part of a period in one cycle of a vertical synchronization signal, a plurality of transistors connected to the plurality of pixel electrodes, a plurality of gate lines connected to the plurality of transistors, wherein the plurality of gate lines includes a first gate line group, a second gate line group, and a third gate line group disposed between the first gate line group and the second gate line group, a gate drive circuit configured to supply gate signals to the plurality of gate lines, a control circuit configured to control the gate drive circuit to transmit the gate signals from the gate drive circuit to the plurality of gate lines during a light-out period which is a period other than the lighting period in the one cycle of the vertical synchronization signal, and a temperature sensor for detecting a temperature, the method comprising:

acquiring the temperature detected by the temperature sensor; and setting a setting number, which is a number of gate lines supplied with the gate signals from the gate drive circuit in one cycle of a horizontal synchronization signal, to a first number, that is greater than one, for the first gate line group and the second gate line group, in a case that the detected temperature is lower than a first threshold temperature, and setting the setting number for the third gate line group to a second number that is equal to or greater than one and less than the first number in the case that the detected temperature is lower than the first threshold temperature.

7. A display device comprising:

a display panel including a plurality of pixel electrodes disposed in a matrix shape and a liquid crystal layer that is driven in response to a voltage applied to the plurality of pixel electrodes;

a backlight configured to irradiate the display panel with light during a lighting period which is part of a period in one cycle of a vertical synchronization signal;

a plurality of transistors connected to the plurality of pixel electrodes;

a plurality of gate lines connected to the plurality of transistors;

a gate drive circuit configured to supply gate signals to the plurality of gate lines;

a control circuit configured to control the gate drive circuit to transmit the gate signals from the gate drive circuit to the plurality of gate lines during a light-out period which is a period other than the lighting period in the one cycle of the vertical synchronization signal; and a temperature sensor for detecting a temperature, wherein the control circuit sets a setting number, which is a number of gate lines supplied with the gate signals from the gate drive circuit in one cycle of a horizontal synchronization signal, to a first number, that is greater than one, in a case that the temperature detected by the temperature sensor is lower than a first threshold temperature, and a line-of-sight sensor that detects a line of sight of a user, wherein the control circuit sets a part of the plurality of gate lines to have the setting number based on a detection result from the line-of-sight sensor, such that the part of the plurality of gate lines includes a gate line corresponding to a position viewed by the user.

* * * * *